United States Patent
Nicholson et al.

(10) Patent No.: US 10,501,259 B2
(45) Date of Patent: Dec. 10, 2019

(54) CONTROL OF BUBBLE SIZE IN A CARBONATED LIQUID

(71) Applicant: PepsiCo, Inc., Purchase, NY (US)

(72) Inventors: Lee M. Nicholson, Katonah, NY (US); Peter S. Given, Ridgefield, CT (US); Prasad V. Joshi, Brookfield, CT (US); Wei Liu, Pittsburgh, PA (US); Denise H. Lefebvre, Southbury, CT (US); Marcin Jankowiak, Poznan (PL)

(73) Assignee: PepsiCo, Inc., Purchase, NY (US)

( * ) Notice: Subject to any disclaimer, the term of this patent is extended or adjusted under 35 U.S.C. 154(b) by 529 days.

(21) Appl. No.: 15/080,402

(22) Filed: Mar. 24, 2016

(65) Prior Publication Data

US 2016/0207695 A1    Jul. 21, 2016

Related U.S. Application Data

(60) Division of application No. 14/148,037, filed on Jan. 6, 2014, now Pat. No. 9,327,462, which is a continuation of application No. 12/908,622, filed on Oct. 20, 2010.

(51) Int. Cl.

| | | |
|---|---|---|
| *B65D 85/73* | (2006.01) | |
| *B29C 49/12* | (2006.01) | |
| *B65D 25/02* | (2006.01) | |
| *B65D 25/38* | (2006.01) | |
| *B65D 17/28* | (2006.01) | |
| *B29D 22/00* | (2006.01) | |
| *B65D 1/02* | (2006.01) | |
| *B65D 17/00* | (2006.01) | |

(Continued)

(52) U.S. Cl.
CPC .............. *B65D 85/73* (2013.01); *B29C 49/12* (2013.01); *B29D 22/003* (2013.01); *B65D 1/023* (2013.01); *B65D 17/02* (2013.01); *B65D 17/4012* (2018.01); *B65D 25/02* (2013.01); *B65D 25/38* (2013.01); *B29C 49/08* (2013.01); *B29C 2049/1228* (2013.01); *B29K 2067/003* (2013.01); *B65D 2517/0049* (2013.01)

(58) Field of Classification Search
None
See application file for complete search history.

(56) References Cited

U.S. PATENT DOCUMENTS

| | | |
|---|---|---|
| 845,175 A | 2/1907 | Arthur |
| 2,054,553 A | 9/1936 | Ballard |
| 2,208,431 A | 7/1940 | Rochow |

(Continued)

FOREIGN PATENT DOCUMENTS

| | | |
|---|---|---|
| CN | 1036186 A | 10/1989 |
| CN | 1048350 A | 1/1991 |

(Continued)

OTHER PUBLICATIONS

Ashby, M., et al., "Metal Foams: Design Guide," First Edition, 263 pages, Elsevier Inc., United States (2000).

(Continued)

*Primary Examiner* — Monica A Huson
(74) *Attorney, Agent, or Firm* — Sterne, Kessler, Goldstein & Fox P.L.L.C.

(57) ABSTRACT

Cans, bottles and/or other containers used to hold a carbonated beverage can include internal features to promote and/or control bubble formation.

17 Claims, 30 Drawing Sheets

(51) Int. Cl.
B29K 67/00 (2006.01)
B29C 49/08 (2006.01)

(56) References Cited

U.S. PATENT DOCUMENTS

| | | |
|---|---|---|
| 2,988,258 A | 6/1961 | Witzke |
| 3,232,495 A | 2/1966 | Schueider |
| 3,363,820 A | 1/1968 | Schilling |
| 3,468,648 A | 9/1969 | Edward |
| 3,470,282 A | 9/1969 | Anthony |
| 3,471,055 A | 10/1969 | Bryant |
| 3,521,788 A | 7/1970 | Gerald et al. |
| 3,792,988 A | 2/1974 | Nowak et al. |
| 3,934,725 A | 1/1976 | Edwards |
| 3,979,009 A | 9/1976 | Walker |
| 4,024,975 A | 5/1977 | Uhlig |
| 4,039,271 A | 8/1977 | Hudson et al. |
| 4,072,491 A | 2/1978 | Kramer et al. |
| 4,105,428 A | 8/1978 | Adams |
| 4,121,976 A | 10/1978 | Gleeson |
| 4,134,510 A | 1/1979 | Chang |
| 4,151,249 A | 4/1979 | Lee |
| 4,170,622 A | 10/1979 | Uhlig |
| 4,174,782 A | 11/1979 | Obsomer |
| 4,254,882 A | 3/1981 | Yoshino |
| 4,261,948 A | 4/1981 | Krishnakumar et al. |
| 4,311,250 A | 1/1982 | Ravve et al. |
| 4,322,008 A | 3/1982 | Schneider |
| 4,334,627 A | 6/1982 | Krishnakumar et al. |
| 4,359,165 A | 11/1982 | Jakobsen |
| 4,525,401 A | 6/1985 | Pocock et al. |
| 4,550,848 A | 11/1985 | Sucato |
| 4,603,831 A | 8/1986 | Krishnakumar et al. |
| 4,728,882 A | 3/1988 | Stanbro et al. |
| 4,768,674 A | 9/1988 | Prescott |
| 4,785,948 A | 11/1988 | Strassheimer |
| 4,861,260 A | 8/1989 | Bartley et al. |
| 4,863,669 A | 9/1989 | Kouyama et al. |
| 4,880,593 A | 11/1989 | Strassheimer |
| 4,892,205 A | 1/1990 | Powers et al. |
| 4,912,048 A | 3/1990 | Smith et al. |
| 4,919,608 A | 4/1990 | Catalanotti et al. |
| 4,928,842 A | 5/1990 | Swenson |
| 4,930,729 A | 6/1990 | Savill |
| 4,959,006 A | 9/1990 | Feddersen et al. |
| 4,977,005 A | 12/1990 | Krishnakumar et al. |
| 4,981,736 A | 1/1991 | Feddersen et al. |
| 4,995,218 A | 2/1991 | Byrne |
| 4,996,823 A | 3/1991 | Byrne |
| 5,009,901 A | 4/1991 | Byrne |
| 5,047,271 A | 9/1991 | Feddersen et al. |
| 5,048,977 A | 9/1991 | Robbins, III |
| 5,065,881 A | 11/1991 | Tarng |
| 5,069,403 A | 12/1991 | Marentic et al. |
| 5,084,393 A | 1/1992 | Rogalsky |
| 5,151,366 A | 9/1992 | Serkes et al. |
| 5,167,552 A | 12/1992 | Johnson, III |
| 5,196,216 A | 3/1993 | Lynch et al. |
| 5,229,142 A | 7/1993 | Yokobayashi |
| 5,232,108 A | 8/1993 | Nakamura |
| 5,251,351 A | 10/1993 | Klotz |
| 5,261,558 A | 11/1993 | Claydon |
| 5,272,084 A | 12/1993 | O'Connell et al. |
| 5,386,955 A | 2/1995 | Savill |
| 5,398,828 A | 3/1995 | Valyi |
| 5,413,244 A | 5/1995 | Ramsey |
| 5,456,629 A | 10/1995 | Bingham |
| 5,466,473 A * | 11/1995 | Forage .............. B65D 85/73 426/115 |
| 5,473,152 A | 12/1995 | Apter et al. |
| 5,490,966 A | 2/1996 | Peterson et al. |
| 5,499,730 A | 3/1996 | Harbour |
| 5,517,804 A | 5/1996 | Lynch |
| 5,521,351 A | 5/1996 | Mahoney |
| 5,542,630 A | 8/1996 | Savill |
| 5,568,973 A | 10/1996 | Gorab |
| 5,620,725 A | 4/1997 | Jamieson et al. |
| D381,558 S | 7/1997 | Schaefer et al. |
| 5,660,867 A | 8/1997 | Reynolds et al. |
| 5,687,444 A | 11/1997 | Hakker |
| 5,780,083 A | 7/1998 | Wright et al. |
| 5,788,111 A | 8/1998 | Waugh |
| 5,788,794 A | 8/1998 | Valyi |
| 5,848,769 A | 12/1998 | Fronek et al. |
| 5,849,241 A | 12/1998 | Connan |
| 5,860,626 A | 1/1999 | Moser |
| D405,316 S | 2/1999 | Spike |
| 5,871,611 A | 2/1999 | Valyi |
| 5,971,202 A | 10/1999 | Filbrun |
| 5,971,326 A | 10/1999 | Bechert |
| 5,988,568 A | 11/1999 | Drews |
| 6,090,460 A | 7/2000 | Collette et al. |
| 6,092,766 A | 7/2000 | Laroche et al. |
| 6,112,932 A | 9/2000 | Holdren |
| 6,131,763 A | 10/2000 | Stanish et al. |
| 6,193,191 B1 | 2/2001 | Falcimaigne et al. |
| 6,220,850 B1 | 4/2001 | Catoen et al. |
| 6,311,863 B1 | 11/2001 | Fleming et al. |
| 6,345,791 B1 | 2/2002 | McClure |
| 6,375,033 B1 | 4/2002 | Fleming |
| 6,405,887 B1 | 6/2002 | Cargile |
| 6,416,389 B1 | 7/2002 | Perry et al. |
| 6,474,498 B1 | 11/2002 | Markham |
| 6,484,971 B2 | 11/2002 | Layukallo |
| 6,588,622 B1 | 7/2003 | Leishman et al. |
| 6,601,833 B2 | 8/2003 | Takai et al. |
| 6,827,228 B2 | 12/2004 | Headen et al. |
| 6,841,262 B1 | 1/2005 | Beck et al. |
| 6,896,147 B2 | 5/2005 | Trude |
| 7,025,922 B2 | 4/2006 | Albisetti |
| 7,032,770 B2 | 4/2006 | Finlay et al. |
| 7,038,181 B2 | 5/2006 | Edmark |
| 7,041,363 B2 | 5/2006 | Krohmer et al. |
| D523,693 S | 6/2006 | Bodum |
| 7,449,331 B2 | 11/2008 | Whitley |
| 7,588,810 B2 | 9/2009 | Semersky |
| 8,485,375 B2 | 7/2013 | Alain |
| 9,327,462 B2 | 5/2016 | Nicholson et al. |
| 2002/0000497 A1 | 1/2002 | Drews |
| 2002/0166837 A1 | 11/2002 | Gonzalez |
| 2003/0094459 A1 | 5/2003 | Kang |
| 2003/0168372 A1 | 9/2003 | Headen et al. |
| 2003/0189046 A1 | 10/2003 | Quispe |
| 2004/0031802 A1 | 2/2004 | Parodi |
| 2004/0159662 A1 | 8/2004 | Johnson et al. |
| 2005/0181161 A1 | 8/2005 | Semersky et al. |
| 2005/0255269 A1 | 11/2005 | Jacobs |
| 2007/0018055 A1 | 1/2007 | Schmidt |
| 2007/0045221 A1 | 3/2007 | Trude et al. |
| 2007/0132160 A1 | 6/2007 | Vieillot |
| 2007/0218231 A1 | 9/2007 | Semersky et al. |
| 2008/0071371 A1 | 3/2008 | Elshout |
| 2008/0251487 A1 | 10/2008 | Semersky et al. |
| 2008/0302758 A1 | 12/2008 | Mody et al. |
| 2009/0084799 A1 | 4/2009 | Mondon |
| 2009/0095759 A1 | 4/2009 | Kelly et al. |
| 2009/0160102 A1 | 6/2009 | Schuster et al. |
| 2009/0218308 A1 | 9/2009 | Bunel et al. |
| 2009/0297748 A1 | 12/2009 | Semersky et al. |
| 2010/0104697 A1* | 4/2010 | Kriegel .............. A47G 19/2233 426/87 |
| 2012/0100266 A1 | 4/2012 | Nicholson et al. |
| 2014/0117592 A1 | 5/2014 | Nicholson et al. |

FOREIGN PATENT DOCUMENTS

| | | |
|---|---|---|
| CN | 2340603 Y | 9/1999 |
| CN | 2546177 Y | 4/2003 |
| CN | 101616843 A | 12/2009 |
| DE | 2116318 A1 | 11/1972 |
| DE | 3305671 A1 | 8/1984 |
| DE | 29817268 U1 | 12/1998 |
| DE | 102004054420 A1 | 5/2006 |
| EP | 0597608 A1 | 5/1994 |

(56) References Cited

FOREIGN PATENT DOCUMENTS

| | | |
|---|---|---|
| EP | 0753468 A1 | 1/1997 |
| EP | 1795328 A1 | 6/2007 |
| EP | 2072220 A1 | 6/2009 |
| FR | 2531891 A1 | 2/1984 |
| FR | 2655528 A1 | 6/1991 |
| GB | 2136679 A | 9/1984 |
| GB | 2211813 A | 7/1989 |
| GB | 2258802 A | 2/1993 |
| GB | 2262538 A | 6/1993 |
| GB | 2420961 A | 6/2006 |
| JP | S52101265 A | 8/1977 |
| JP | S60145918 A | 8/1985 |
| JP | S62246830 A | 10/1987 |
| JP | H03191766 A | 8/1991 |
| JP | H0597149 A | 4/1993 |
| JP | H05140392 A | 6/1993 |
| JP | H06211244 A | 8/1994 |
| JP | H08175824 A | 7/1996 |
| JP | H08242998 A | 9/1996 |
| JP | H08242999 A | 9/1996 |
| JP | H08252159 A | 10/1996 |
| JP | H08268436 A | 10/1996 |
| JP | H10234549 A | 9/1998 |
| JP | 2004075087 A | 3/2004 |
| JP | 2005288062 A | 10/2005 |
| JP | 2006021805 A | 1/2006 |
| JP | 2008265251 A | 11/2008 |
| NL | 7801292 A | 8/1978 |
| RU | 43853 U1 | 2/2005 |
| SU | 1709898 A3 | 1/1992 |
| WO | WO-9002793 A1 | 3/1990 |
| WO | WO-9303658 A1 | 3/1993 |
| WO | WO-9304945 A1 | 3/1993 |
| WO | WO-9315973 A1 | 8/1993 |
| WO | WO-9725195 A1 | 7/1997 |
| WO | WO-0041602 A1 | 7/2000 |
| WO | WO-2008112024 A1 | 9/2008 |
| WO | WO-2010048488 A1 | 4/2010 |

OTHER PUBLICATIONS

Citizendium, "Nucleation," accessed at http://en.citizendium.org/wiki/Nucleation, accessed on Aug. 6, 2010, 4 pages.
Dyer, P.E., et al., "$CO_2$ Laser Ablative Etching of Polyethylene Terephthalate," Abstract, Applied Physics B Photophysics and Laser Chemistry 48(6):489-493, Springer-Verlag, Germany (1989).
Liger-Belair, G., et al., "Effervescence in a glass of Champagne: A Bubble Story," Europhysics News 33(1):10-14, European Physical Society, France (Jan./Feb. 2002).
Liger-Belair, G., "The Physics and Chemistry Behind the Bubbling Properties of Champagne and Sparkling Wines: A State-of-the-Art Review," Journal of Agricultural and Food Chemistry 53(8):2788-2802, American Chemical Society, United States (Mar. 18, 2005).
Scardina, Robert Paolo, "The Fundamentals of Bubble Formation in Water Treatment", accessed at http://web.archive.org/web/20060916042031\http://scholar.lib.vt.edu/theses/available/etd-02242000-20530043/unrestricted/Chapter1.pdf (2006).
Takase, Masao, "The Role of Silicone Surfactants as Surface Tension Reducing Agents in Polyurethane Foam," accessed at http://www.dowcorning.com.cn/zh_CN/content/poluret/silicone_functions_polyurethane.pdf (Sep. 26, 2006).
Wikipedia, "Nucleation," accessed at http://en.wikipedia.org/wiki/Nucleation, accessed on Aug. 6, 2010, 8 pages.
Zare, R.N., "Strange Fizzical Attraction," Journal of Chemical Education 82(5):673-674, Chemical Education Today, United States (May 2005).
Machine Translation of Steinhoff (FR2531891), Feb. 24, 1984.
Patent Examination Report No. 1 in AU2011318445 dated Feb. 26, 2015.
Office Action in CA2815314 dated Apr. 11, 2014.
Notification of the First Office Action in CN201180057850.X dated Jul. 28, 2014.
Communication in EP11776272.4 dated Feb. 20, 2014.
First Office Action in MX/a/2013/004479 dated Jul. 28, 2015, with English translation.
Miscellaneous statement regarding official action in related Pakistan patent application No. 733/2011, dated May 14, 2013.
International Search Report and Written Opinion for International Application No. PCT/US2011/053819, dated Feb. 27, 2012.
Official Action in RU2013122851 dated Aug. 1, 2014, with English translation.
Examination Report No. 1 for AU Appl. No. 2015249132, dated May 9, 2016, IP Australia, Canberra, Australia, 2 pages.
Requisition by the Examiner for CA Appl. No. 2,875,879, dated Mar. 7, 2016, Canadian Intellectual Property Office, Quebec, Canada, 4 pages.
Notification of the First Office Action for CN Appl. No. 201510221846.2 and its English translation, dated Aug. 2, 2016, The State Intellectual Property Office of the People's Republic of China, Beijing, China, 13 pages.
Extended European Search Report for EP Application No. EP 15167380.3, Munich, Germany, dated Sep. 11, 2015, 5 pages.
Official Action for RU Appl. No. 2014152343/05(083692) and its English translation, dated Mar. 14, 2016, Rospatent, Federal Institute of Industrial Property, Moscow, Russian Federation, 8 pages.
Decision on Grant for RU Appl. No. 2014152343/05(083692) and its English translation, dated May 30, 2016, Rospatent, Federal Institute of Industrial Property, Moscow, Russian Federation, 11 pages.
Office Action dated Feb. 14, 2013, in U.S. Appl. No. 12/908,622, inventors Nicholson et al., filed Oct. 20, 2010.
Office Action dated Aug. 5, 2013, in U.S. Appl. No. 12/908,622, inventors Nicholson et al., filed Oct. 20, 2010.
Office Action dated Apr. 8, 2015, in U.S. Appl. No. 14/148,037, inventors Nicholson et al., filed Jan. 6, 2014.
Office Action dated Jul. 10, 2015, in U.S. Appl. No. 14/148,037, inventors Nicholson et al., filed Jan. 6, 2014.
Office Action dated Sep. 9, 2015, in U.S. Appl. No. 14/148,037, inventors Nicholson et al., filed Jan. 6, 2014.
Notice of Allowance dated Dec. 31, 2015, in U.S. Appl. No. 14/148,037, inventors Nicholson et al., filed Jan. 6, 2014.
Examiner's Report issued in Canadian Patent Application No. 2,875,879 dated May 18, 2017.

* cited by examiner

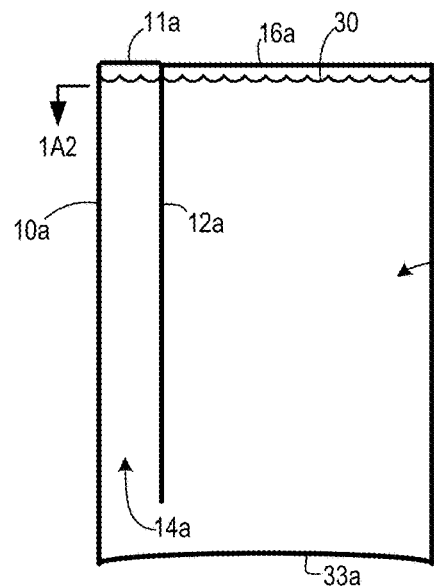 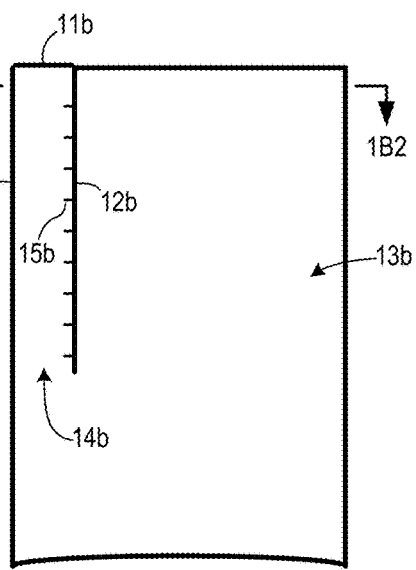
FIG. 1A1  FIG. 1B1
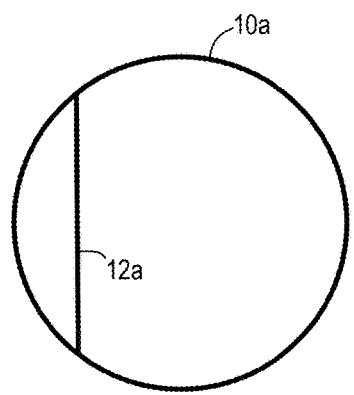 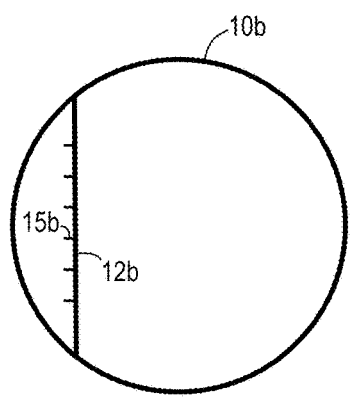
FIG. 1A2  FIG. 1B2

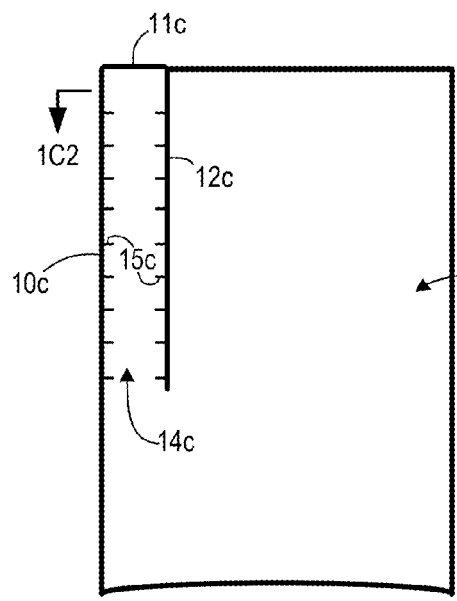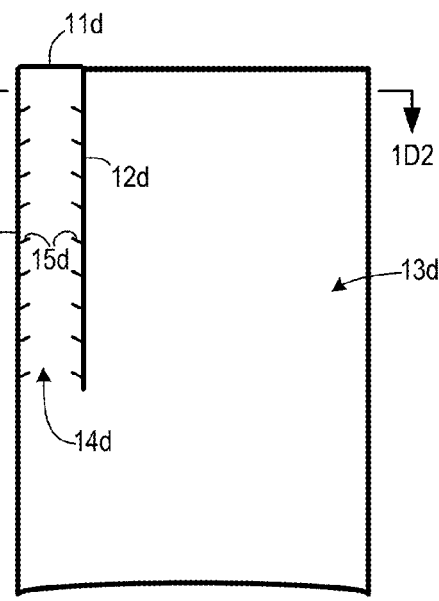
FIG. 1C1              FIG. 1D1
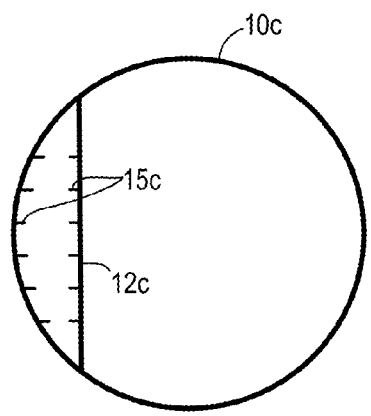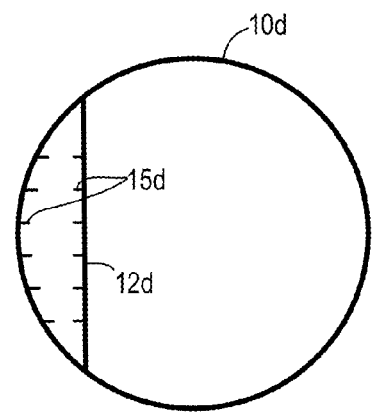
FIG. 1C2              FIG. 1D2

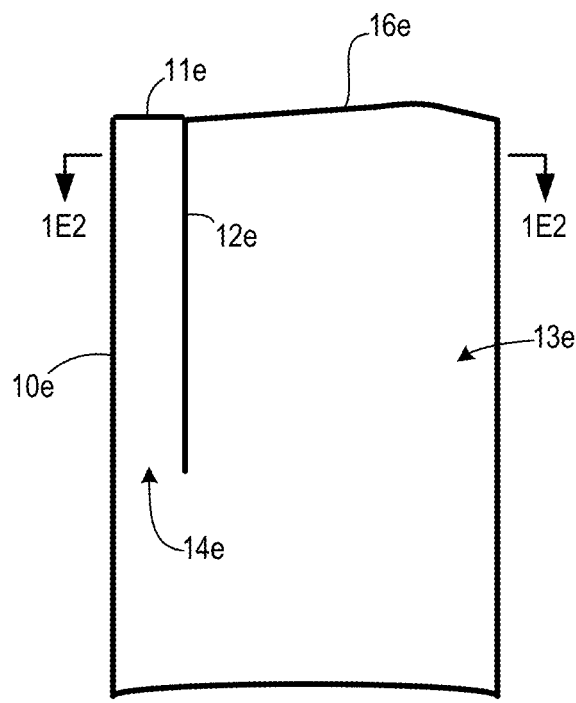
FIG. 1E1
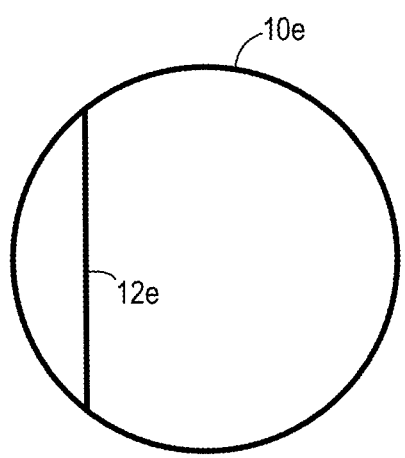
FIG. 1E2

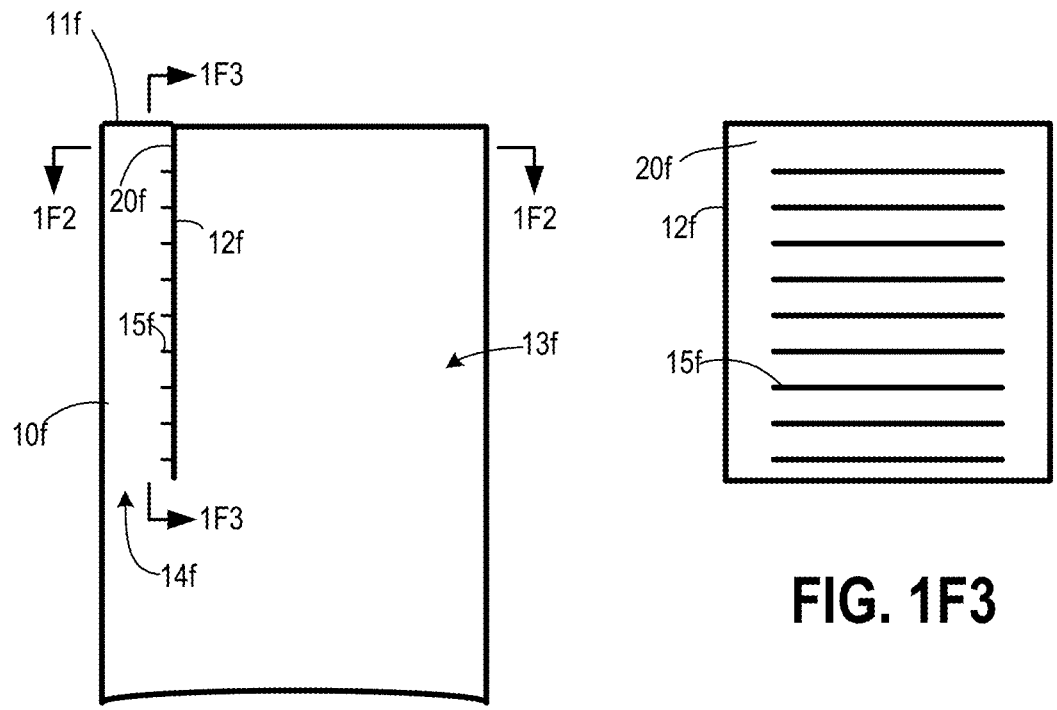
FIG. 1F1
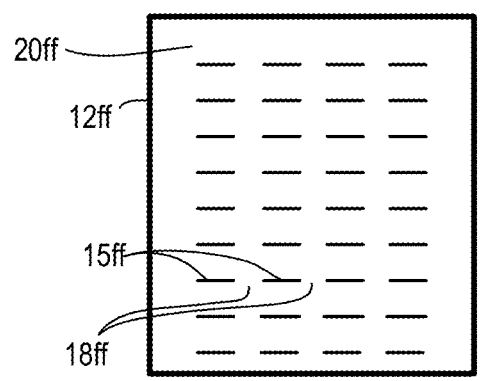
FIG. 1F3
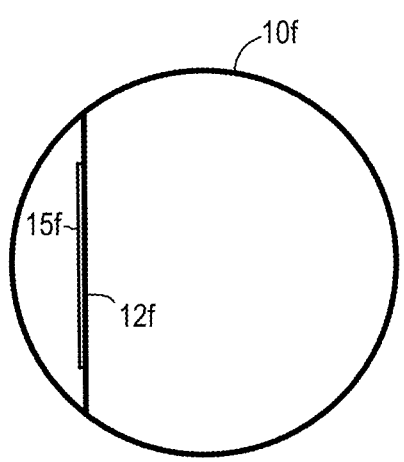
FIG. 1F2
FIG. 1F4

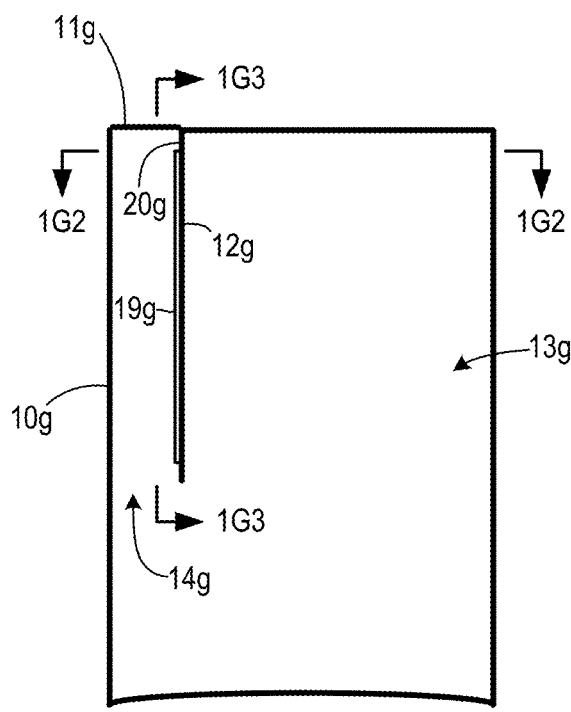
FIG. 1G1
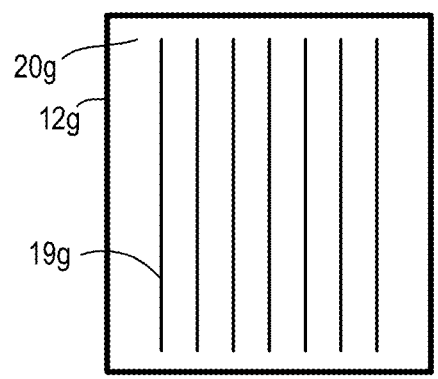
FIG. 1G3
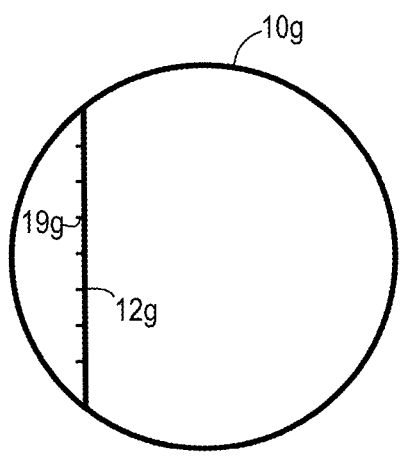
FIG. 1G2

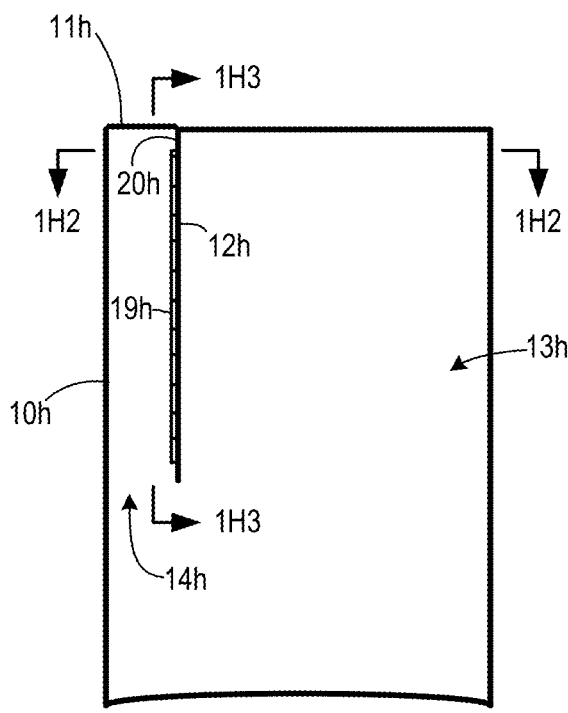
FIG. 1H1
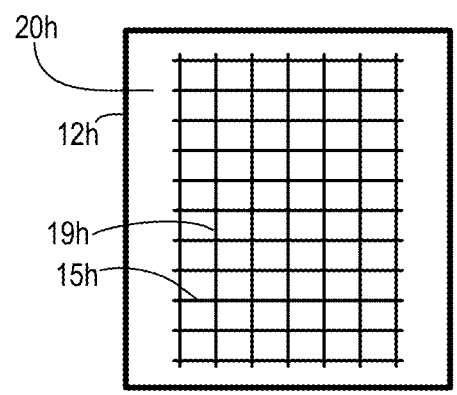
FIG. 1H3
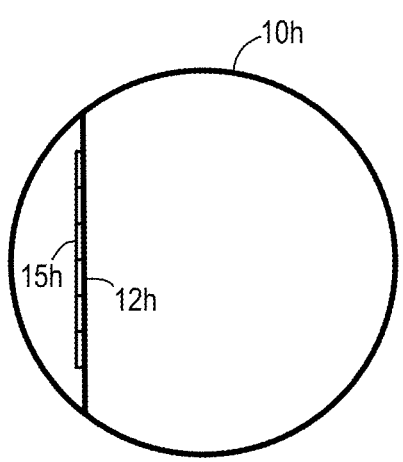
FIG. 1H2

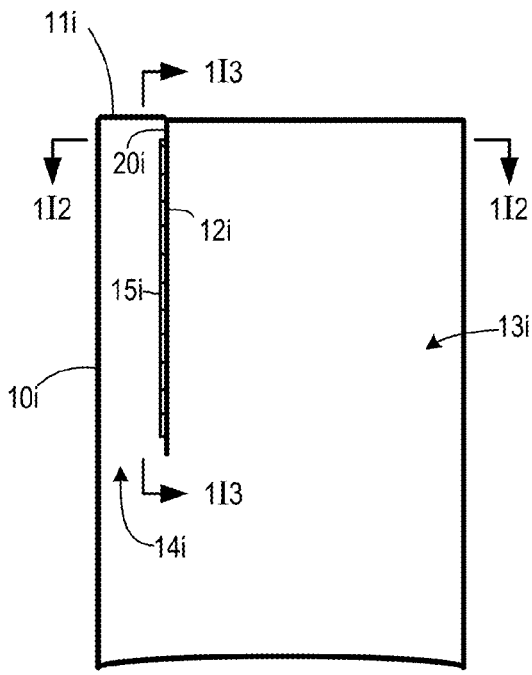
FIG. 1I1
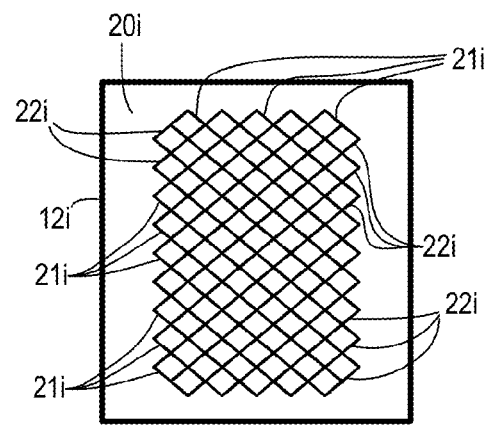
FIG. 1I3
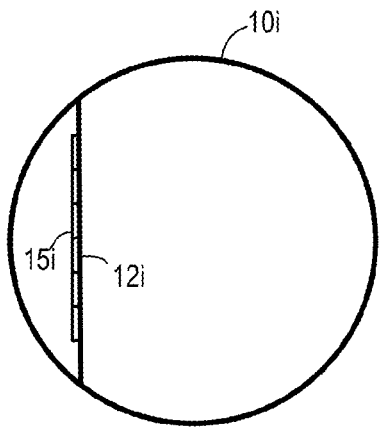
FIG. 1I2 front view of alternative riblet design riblet ridges are represented by thick lines, groves by thin lines

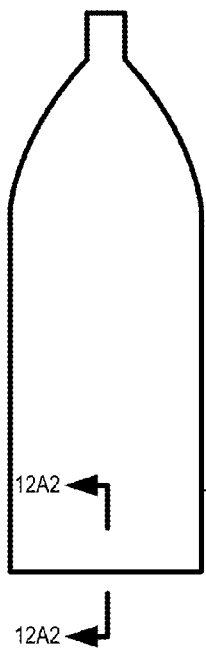
FIG. 12A1
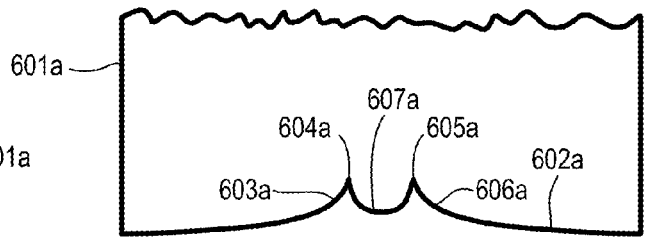
FIG. 12A2
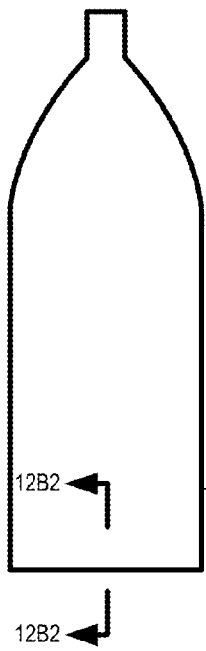
FIG. 12B1
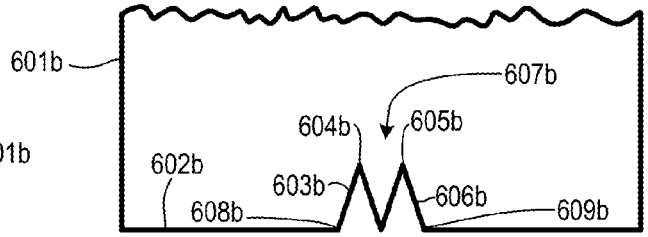
FIG. 12B2

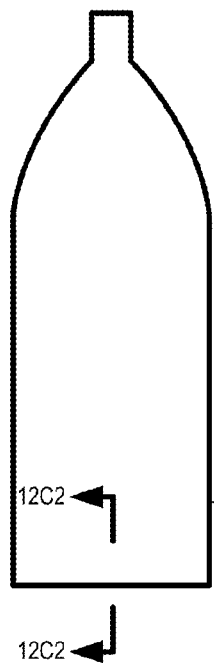
FIG. 12C1
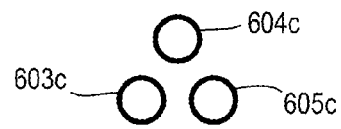
FIG. 12C3
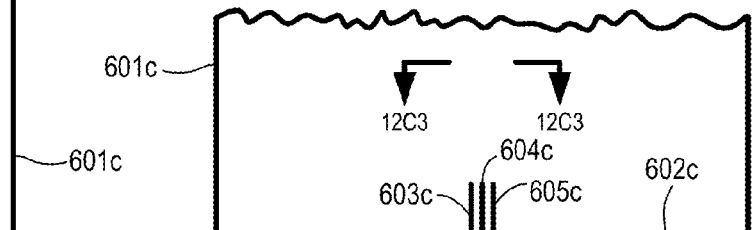
FIG. 12C2
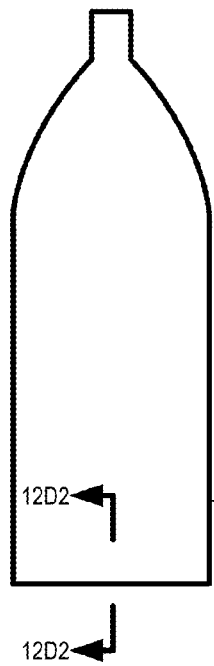
FIG. 12D1
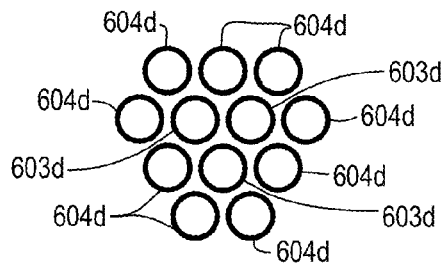
FIG. 12D3
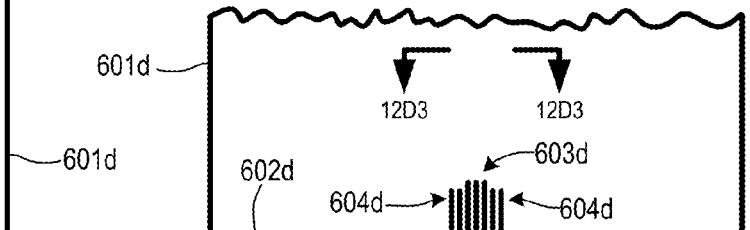
FIG. 12D2

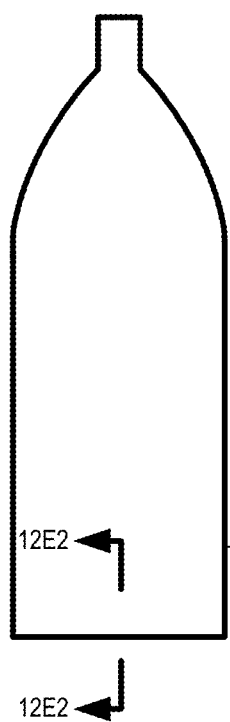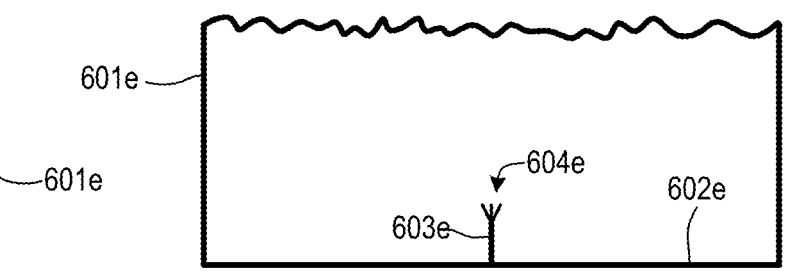
FIG. 12E1  FIG. 12E2

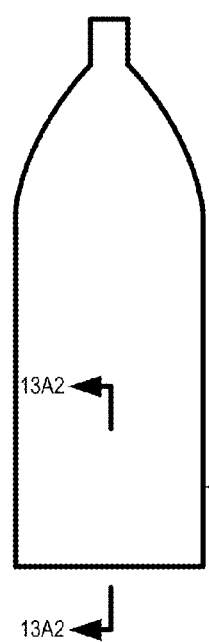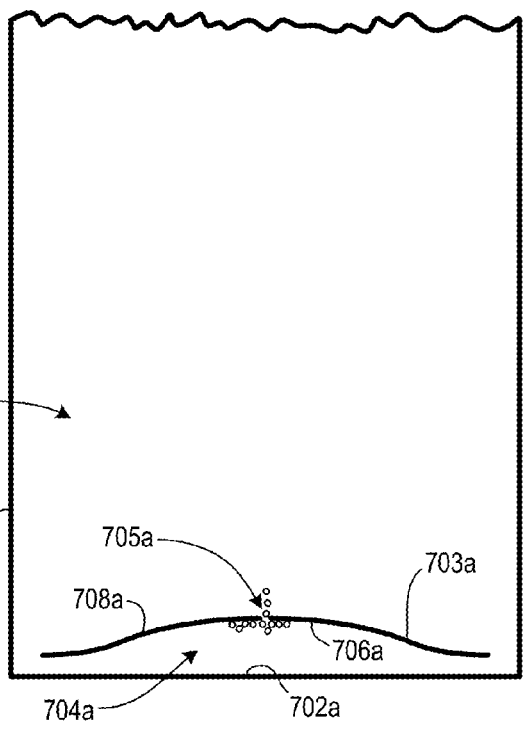
FIG. 13A1    FIG. 13A2

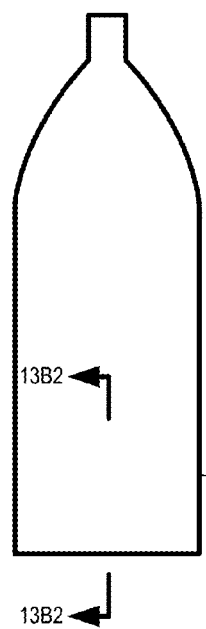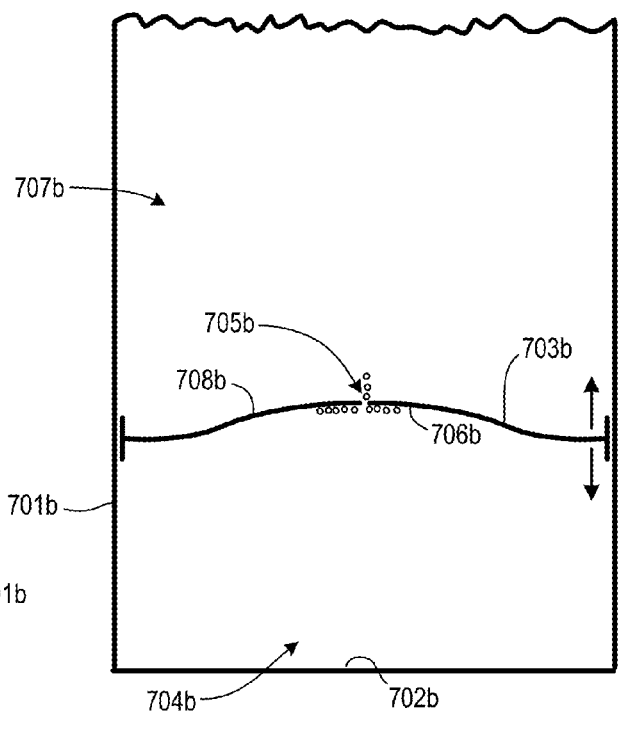
FIG. 13B1          FIG. 13B2

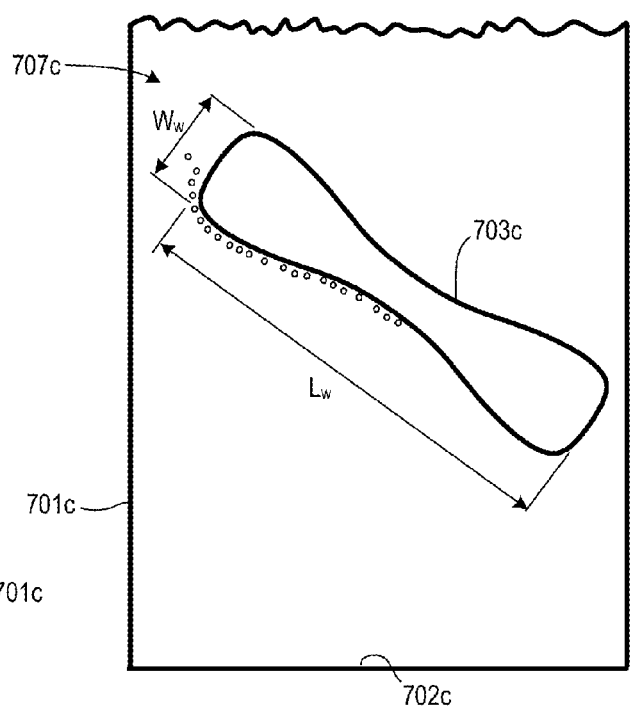
FIG. 13C1        FIG. 13C2

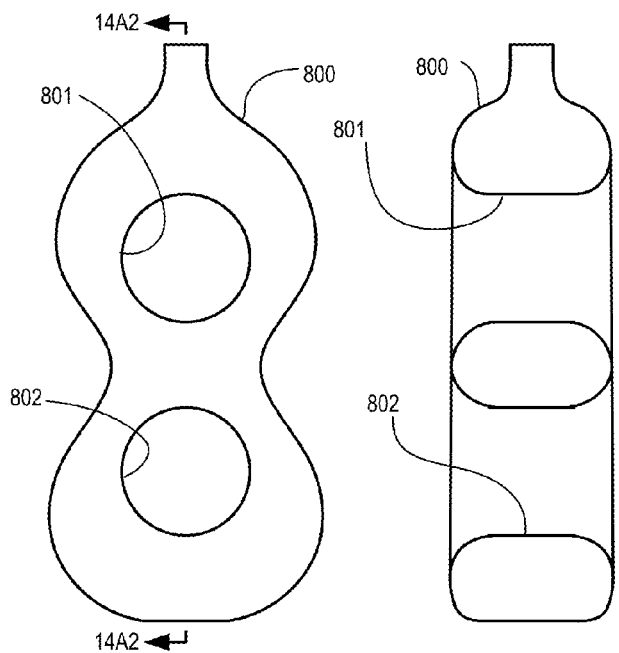
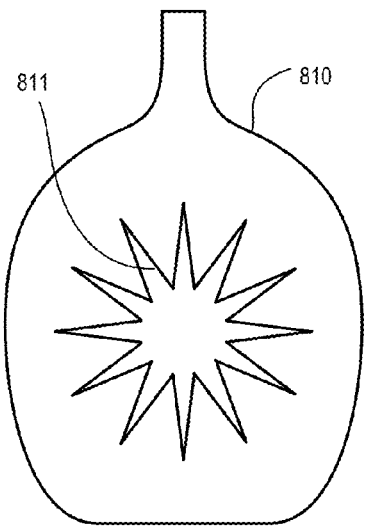
FIG. 14A1  FIG. 14A2  FIG. 14B
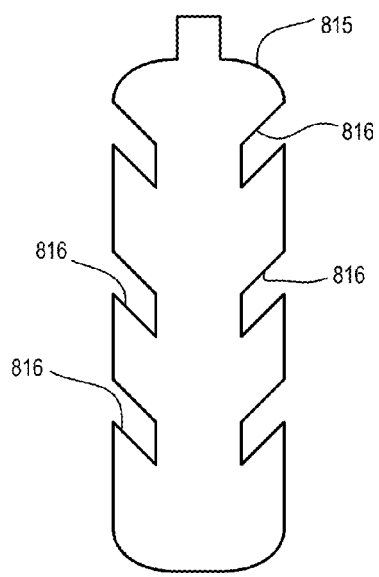
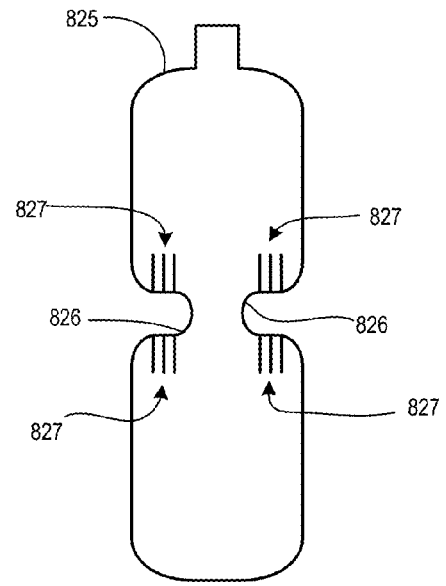
FIG. 14C  FIG. 14D

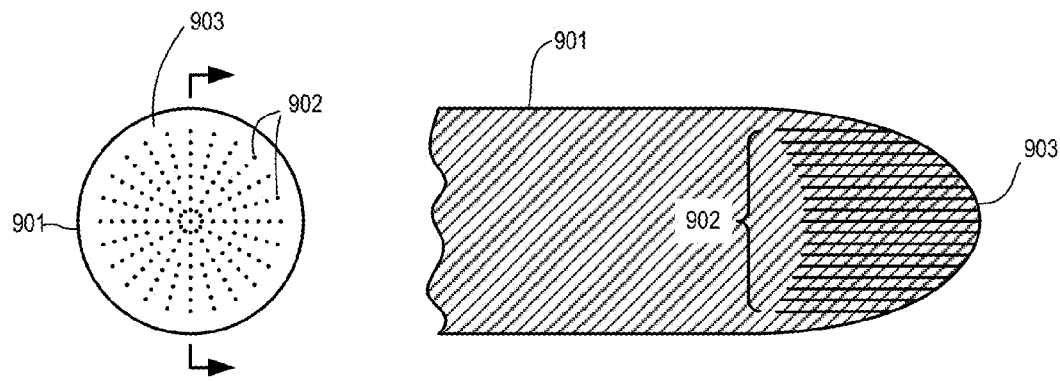
FIG. 15A   FIG. 15B
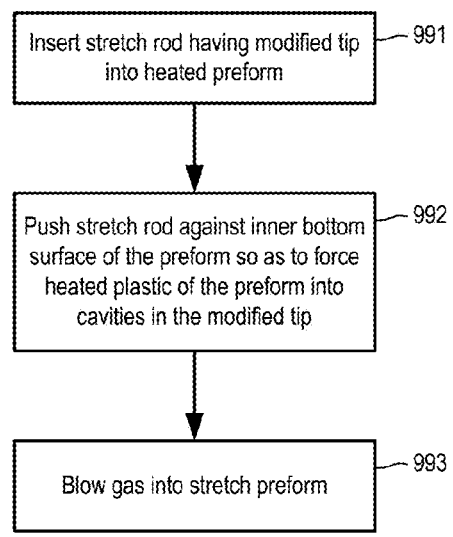
FIG. 15C

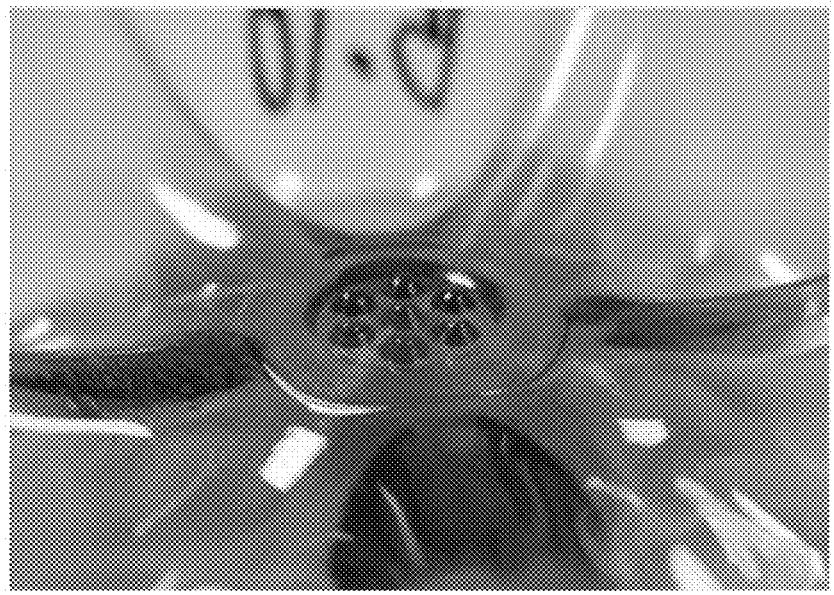
FIG. 17C
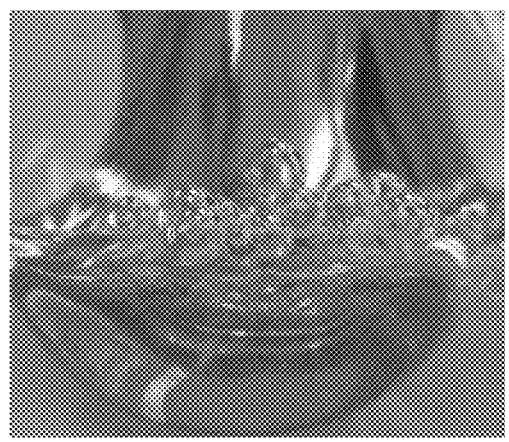 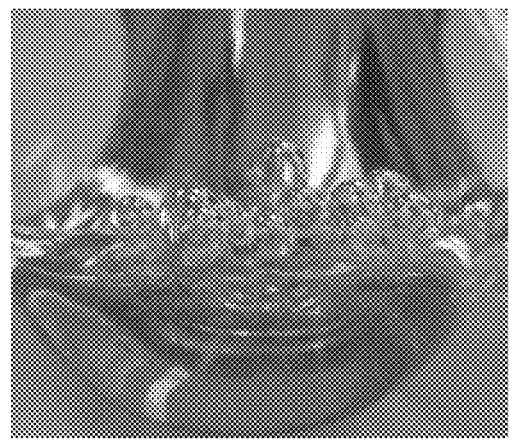
FIG. 17D  FIG. 17E

CONTROL OF BUBBLE SIZE IN A CARBONATED LIQUID

CROSS-REFERENCE TO RELATED APPLICATIONS

This application is a divisional application of U.S. patent application Ser. No. 14/148,037, filed Jan. 6, 2014, which is a continuation of U.S. patent application Ser. No. 12/908,622, titled "Control of Bubble Size in a Carbonated Liquid" and filed Oct. 20, 2010. Application Ser. No. 14/148,037 and application Ser. No. 12/908,622, in their entirety, are incorporated by reference herein.

BACKGROUND

The properties of bubbles produced in a carbonated liquid can affect use of that liquid for its intended purpose. For example, the properties of bubbles produced in a carbonated beverage can impact the perceived taste of the beverage and/or the sensation that the beverage creates in the mouth of a person drinking the beverage (the "mouth feel" of the beverage). In many circumstances, it is therefore desirable to control the size of bubbles that are produced in a beverage or other liquid.

SUMMARY

This Summary is provided to introduce a selection of concepts in a simplified form that are further described below in the Detailed Description. This Summary is not intended to identify key or essential features of the invention or to exhaustively list all embodiments.

Some embodiments include containers (e.g., cans, bottles) for holding a carbonated beverage. Such containers can be formed from plastic, metal, glass and/or other materials and include one or more internal features to promote and control bubble formation. In some embodiments, these features can include an internal partition. Such partitions can include additional surface features of various types (e.g., ridges or other linearly extending protrusions, bumps). Additional embodiments may include beverage containers in which features to promote and/or control bubble formation are formed on an interior bottom surface, on an interior side surface, and/or in a neck region. Still other embodiments can include a container with a bubble catcher or other structure that may be fixed to the container interior or allowed to float within a liquid held in the container. Yet other embodiments can include methods for fabricating and/or for using any of the herein-disclosed containers.

BRIEF DESCRIPTION OF THE DRAWINGS

FIGS. 1A1-1I3 are partially schematic cross-sectional views of beverage containers, according to some embodiments, that include internal partitions.

FIG. 3 shows a neck portion of a bottle having riblets according to another embodiment.

FIG. 4A shows a bottle having interior dimples according to some embodiments.

FIG. 4B shows examples of additional dimple shapes and patterns according to some embodiments.

FIGS. 12A1-12E2 show beverage containers, according to some embodiments, having bubble forming structures formed in bottom portions of the containers.

FIGS. 13A1-13C2 show beverage containers having bubble catching structures according to some embodiments.

FIGS. 14A1-14D are beverage containers according to additional embodiments.

FIGS. 15A and 15B are front and cross-sectional views, respectively, of an end portion of an injection molding core rod according to some embodiments.

FIG. 15C is a block diagram showing steps in forming a plastic bottle according to some embodiments.

FIG. 17C shows an interior of a plastic bottle created using one of the stretch rods of FIG. 16.

FIGS. 17D and 17E show nucleation resulting from surface features similar to those shown in FIG. 17C.

DETAILED DESCRIPTION

Figure 2:
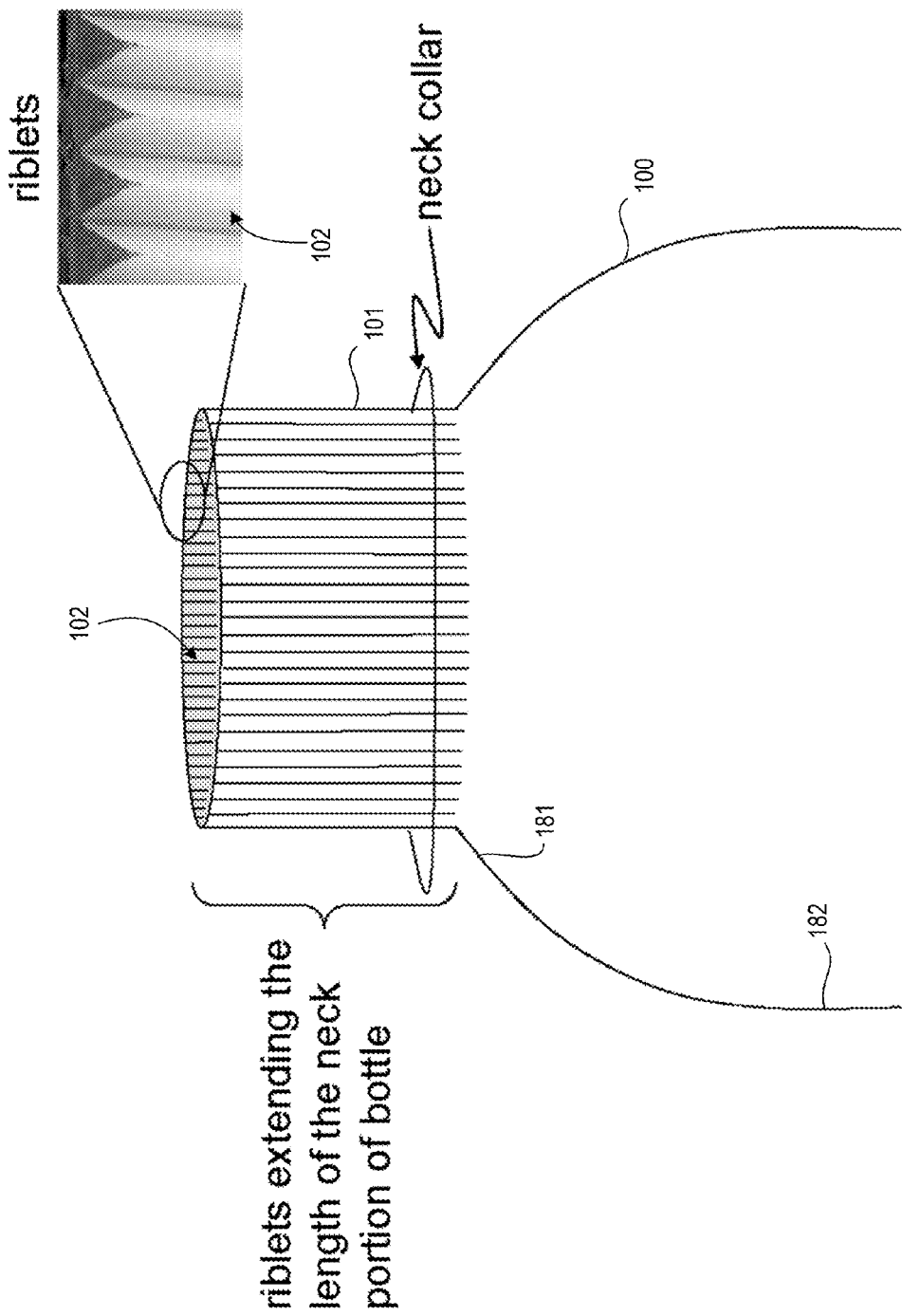
FIG. 2 shows a bottle having a neck section with riblets formed around the entire inner circumference, according to some embodiments.

Changes in the amount and type of bubbles in a carbonated beverage can significantly affect the mouth feel of that beverage. For this and other reasons, it is desirable to manipulate one or more properties of the bubbles produced in a beverage. Such properties can include the size of bubbles produced, the shape of bubbles, the amount of bubbles generated, and the rate at which bubbles are released or otherwise generated.

A carbonated beverage may include a liquid beverage matrix and a dissolved gas. The beverage matrix may include water, syrup, flavorings and other dissolved or suspended material(s). The dissolved gas may be, e.g., carbon dioxide. Carbon dioxide may also be generated in situ from aqueous carbonic acid. Upon lowering pressure (e.g., by opening a sealed beverage container), carbonic acid is converted to carbon dioxide gas. Because carbon dioxide is poorly soluble in water, it is released into the liquid matrix as bubbles.

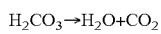

$$H_2CO_3 \rightarrow H_2O + CO_2$$

Manipulation of bubble properties can depend on numerous factors. One such factor is interfacial tension between the dissolved gas and the liquid matrix. Another factor is the composition of the liquid matrix. For example, bubble size can to some extent be controlled by adding surface active agents (surfactants, emulsifiers, etc.) to a beverage matrix. In particular, the champagne industry has researched this issue and found that glycoprotein from grapes can be a controlling factor in small bubble size.

Bubble properties can also depend on gaseous nucleation, i.e., the formation of bubbles from the gas dissolved in the beverage liquid matrix. The process of bubble formation in a carbonated beverage is analogous to formation of bubbles in a supersaturated solution of a gas. However, and as explained in more detail in Example 1 below, formation of bubbles in a supersaturated continuous liquid is improbable.

Thus, some type of discontinuity is generally needed to form bubbles. These discontinuities can be the result of, and nucleation can thus be affected by, other ingredients dissolved or suspended in the liquid matrix, surface properties of a bottle or other container holding the beverage, and/or ice or other objects in the beverage. Gaseous nucleation in a carbonated beverage typically occurs on a surface that is at least partially wettable by the beverage. This surface can be a surface of the beverage container and/or a surface (or surfaces) of particles or other objects that are suspended or floating in the beverage.

The amount of bubbles that can be created in a carbonated liquid will depend upon the gas available in the liquid, e.g., as dissolved gas or as a precursor such as carbonic acid. The amount of gas available in a carbonated liquid is proportional to the pressure inside the container holding the liquid. When sealed, the pressure inside such a container is typically greater than atmospheric pressure. When the container is opened, the contained liquid is exposed to atmospheric pressure. This reduction in pressure is the driving force for the formation of bubbles and foam. The size, shape and rate of release of bubbles will depend upon various factors that can include: (a) the surface(s) on which bubbles will nucleate, (b) viscosity of the liquid matrix of the carbonated liquid, (c) interfacial tension between the carbonated liquid and the wall(s) of the container, and (d) temperature of the carbonated liquid. In some cases, it may not be practical to vary factors (b) and (c), as this may require altering the chemical composition of the beverage. Attempting to modify temperature (factor (d)) may also be impractical. However, factor (a) can often be modified without affecting the chemical composition of a beverage and without reliance on opening of a beverage container under unusual temperature conditions.

The size of the bubbles formed in a carbonated beverage can be affected by the availability of bubble nucleation sites on a surface of the beverage container and/or on other surfaces in contact with the beverage, as well as by the surface tension of the carbonated liquid and the equilibrium pressure inside of a bubble for a given bubble size. With regard to bubble shape, the tendency of a bubble to acquire spherical shape is based on low surface energy requirements for a sphere (i.e., a sphere has the lowest surface area/volume ratio). As a bubble rises, it must overcome the hydrostatic pressure exerted by the liquid above it. During the course of rising, the bubble has to push the liquid surrounding it. This tends to change the bubble shape from spherical to somewhat elliptical. When two bubbles meet, they do so at a plane surface which again creates lowest surface area possible for the two bubbles. As the number of bubbles touching each other increases, the shape of a larger bubble formed by the joining smaller bubbles can vary accordingly to create the lowest surface area possible for volume of the joined bubbles. Therefore, the shape of bubbles can also be controlled by the number of bubbles coming in contact with one another. To a lesser extent, the shape of bubbles may also depend upon the location and depth at which nucleation occurs.

The mouth feel of a beverage is related to the size and number of the bubbles formed. The foaminess of a carbonated liquid is directly proportional to the number of bubbles formed. Thus, variation in foaminess can lead to a different mouth feel. The addition of extremely small particles inside of a carbonated liquid can change the mouth feel. In particular, such particles can facilitate nucleation of bubbles inside the liquid, thereby increasing bubble quantity.

The rate of release of the bubbles in a carbonated beverage can be affected by varying the pressure to which the beverage is exposed. The rate at which released bubbles reach the surface of a beverage can be modified by creating obstacles in the path of rising bubbles. Such obstacles can be introduced inside the liquid by introducing extra plates or edges. Such plates, edges and/or other structures can be used to create an indirect path to the beverage surface.

The size, shape, release rate and quantity of bubbles are interrelated. These properties can be modified by modifying the design of a container used to hold a carbonated beverage. In many cases, this involves creating more surface area that contacts the beverage. This extra surface area can provide added stability to rising bubbles and provide more control of, e.g., the rate of bubble release.

FIGS. 1A1-1I3 are partially schematic cross-sectional views of beverage containers, according to some embodiments, that include internal partitions. The partition walls in these embodiments promote bubble formation by, e.g., providing increased surface area for bubble nucleation. Moreover, these partition walls can also cause splashing of beverage within a container and thereby generate more bubbles. In many conventional containers, most foam is generated immediately after a container is opened. Mechanical splashing of a beverage by a partition wall may cause additional bubble generation, for a longer duration, after the container is opened. For example, a consumer sipping a carbonated beverage will tend to move the container from an upright condition so as to tilt the container and place the container opening at the consumer's mouth. As a result of this periodic tilting movement, the partition wall will agitate the beverage. This can promote bubble generation after container opening and help the beverage to remain in a foamy condition. Small appendages can be added to a partition wall to hinder the path of rising bubbles and slow the breakdown of the foam.

FIG. 1A1 is a cross-sectional side view of a sealed beverage container can 10a according to at least one embodiment. FIG. 1A2 is a top cross-sectional view of can 10a taken from the location shown in FIG. 1A1. Container 10a includes a base 33a, a side wall 31a and a top 16a. Internal surfaces of base 33a, side wall 31a and top 16a define an internal volume 13a into which a carbonated beverage 30 has been sealed. An outlet 11a located in top 16a is shown closed in FIG. 1A1, but is configured for opening by a consumer and is positioned on container 10a so as to permit draining of beverage 30 from container 10a after outlet 11a is opened. Although the embodiments shown in FIGS. 1A1-1I3 are can beverage containers, features similar to those shown and described in connection with FIGS. 1A1-1I3 can also be included in other types of beverage containers in other embodiments (e.g., bottles, reusable or disposable cups, etc.).

A partition 12a extends downward from the top 16a of container 10a and separates a passage 14a from the remainder of a main volume 13a. As shown in FIGS. 1A1 and 1A2, baffle 12a is attached to portions of the internal surfaces of top 16a and side wall 31a. When base 33a is resting on a flat surface, partition 12a is oriented vertically.

Passage 14a is smaller and differently shaped than the remainder of main volume 13a. In order for beverage 30 within the remainder of main volume 13a to exit through outlet 11a after opening, beverage 30 must flow around the lower end of partition 12a and into passage 14a. Partition 12a can be formed from the same material used for the side walls of container 10a or from some other material. In at least some embodiments, passage 14a is the only fluid path between the remainder of main volume 13a and outlet 11a.

FIG. 1B1 is a cross-sectional side view of a beverage container can 10b according to another embodiment. FIG. 1B2 is a top cross-sectional view of can 10b taken from the location shown in FIG. 1B1. The top, side wall and base of container 10b, as well as tops, side walls and bases of other containers in FIGS. 1B1-1I3, the positioning of elements of those containers, the openable natures of outlets 11, and various other features of the containers shown in FIGS. 1B1-1I3 are similar to features of container 10a shown in FIGS. 1A1-1A2. For convenience, several of such features are not separately discussed in connection with FIGS. 1B1-1I3 where the similarities with features of container 10a are readily apparent from the drawings and where further discussion is not required to clearly understand the depicted embodiments. Similarly, carbonated beverage 30 is for convenience omitted from FIGS. 1B1-1I3. However, the presence of beverage 30 sealed within each of the containers of said figures is understood.

Partition 12b is similar to partition 12a of FIG. 1A1, but may not extend as far from the beverage can top as is the case with partition 12a. In order for beverage contained within a remainder of main volume 13b to exit through an outlet 11b (shown in a closed position in FIG. 1B1), that beverage must flow around the lower end of partition 12b and into passage 14b. Partition 12b can be formed from the same material used for the side walls of container 10b or from some other material. Partition 12b includes numerous small surface features 15b to promote nucleation and/or aeration by creating turbulent flow through passage 14b. Surface features 15b can include short hair-like projections, small bumps, pits or other surface indentations, etc., as well as combinations of various types of surface features.

FIG. 1C1 is a cross-sectional side view of a beverage container can 10c according to another embodiment. FIG. 1C2 is a top cross-sectional view of can 10c taken from the location shown in FIG. 1C1. Outlet 11c, partition 12c, main volume 13c and surface features 15c are similar to outlet 11b, partition 12b, main volume 13b and surface features 15b of FIG. 1B1. Container 10c of FIGS. 1C1 and 1C2 differs from container 10b of FIGS. 1B1 and 1B2 by having surface features 15c on both sides of passage 14c.

FIG. 1D1 is a cross-sectional side view of a beverage container can 10d according to another embodiment. FIG. 1D2 is a top cross-sectional view of can 10d taken from the location shown in FIG. 1D1. Outlet 11d, partition 12d, main volume 13d and passage 14d are similar to outlet 11c, partition 12c, main volume 13c and passage 14c of FIG. 1C1. Container 10d of FIGS. 1D1 and 1D2 differs from container 10c of FIGS. 1C1 and 1C2 by having surface features 15d that are angled towards outlet 11d.

FIG. 1E1 is a cross-sectional side view of a beverage container can 10e according to another embodiment. FIG. 1E2 is a top cross-sectional view of can 10e taken from the location shown in FIG. 1E1. Can 10e includes an outlet 11e, partition 12e, main volume 13e and passage 14e similar to features described in connection with previous embodiments. In the embodiment of FIG. 1E1, however, can 10e has no added surface features in passage 14e. Moreover, can 10e includes a top 16e that is curved so as to modify pressure exerted on the carbonated liquid. Although shown as an outward curve in FIG. 1E1 (i.e., top 16e is convex on its outwardly exposed surface), top 16e could alternatively be curved inward (i.e., have a concave exposed outer surface) or have other types of curvatures.

Figure 3:
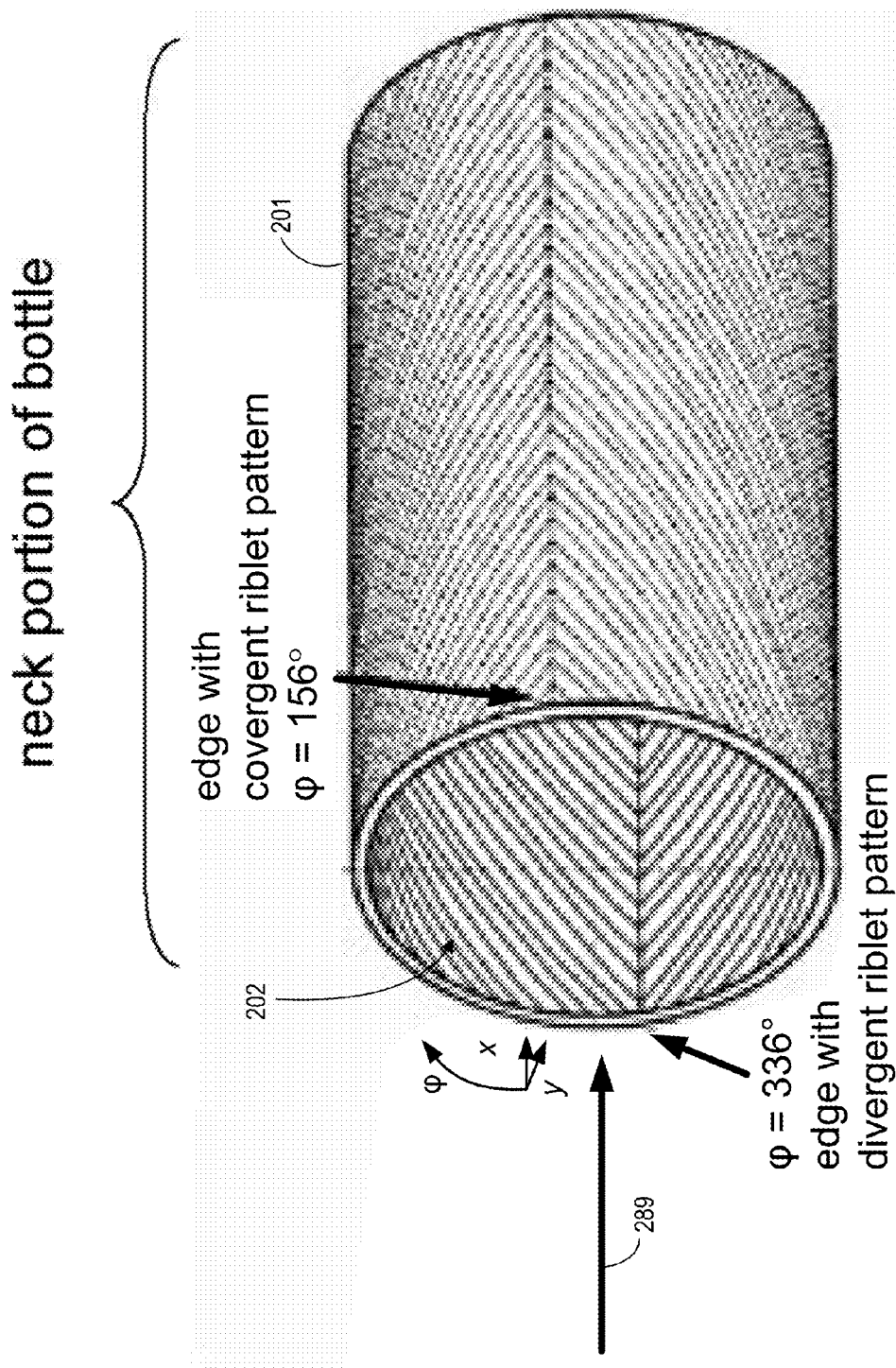

FIG. 1F1 is a cross-sectional side view of a beverage container can 10f according to another embodiment. FIG. 1F2 is a top cross sectional view of can 10f taken from the location shown in FIG. 1F1. FIG. 1F3 is a side cross-sectional view, taken from the location indicated in FIG. 1F1 and omitting the outer walls of can 10f, showing the face 20f of partition 12f inside of passage 14f. Can 10f is similar to can 10b of FIG. 1B1, except that partition 12f of can 10f includes multiple horizontal linear protrusions (e.g., ribs, ridges, riblets, etc.) 15f. Linear protrusions 15f are oriented in directions that are generally perpendicular to a direction of primary flow through passage 14f when beverage is drained from the remainder of main volume 13f via outlet 11f. Each of linear protrusions 15f can extend from face 20f by a height of, e.g., 100 nanometers (nm) to 5 millimeters (mm). Each of linear protrusions 15f can be uniform in length, width, height and other characteristics, or various of linear protrusions 15f may differ in on one or more dimensions or other characteristics. For convenience, FIGS. 1F1-1F3 only show 9 linear protrusions 15f. However, a much larger number of linear protrusions 15f could be included, and those linear protrusions could have a much closer spacing. Linear protrusions 15f can be arranged in a regular pattern as shown or may have an irregular vertical and/or horizontal distribution. Partition 12f is otherwise similar to partition 12b of FIG. 1B1. Outlet 11f and main volume 13f are similar to outlet 11b and main volume 13b of FIG. 1B1.

Figure 4:
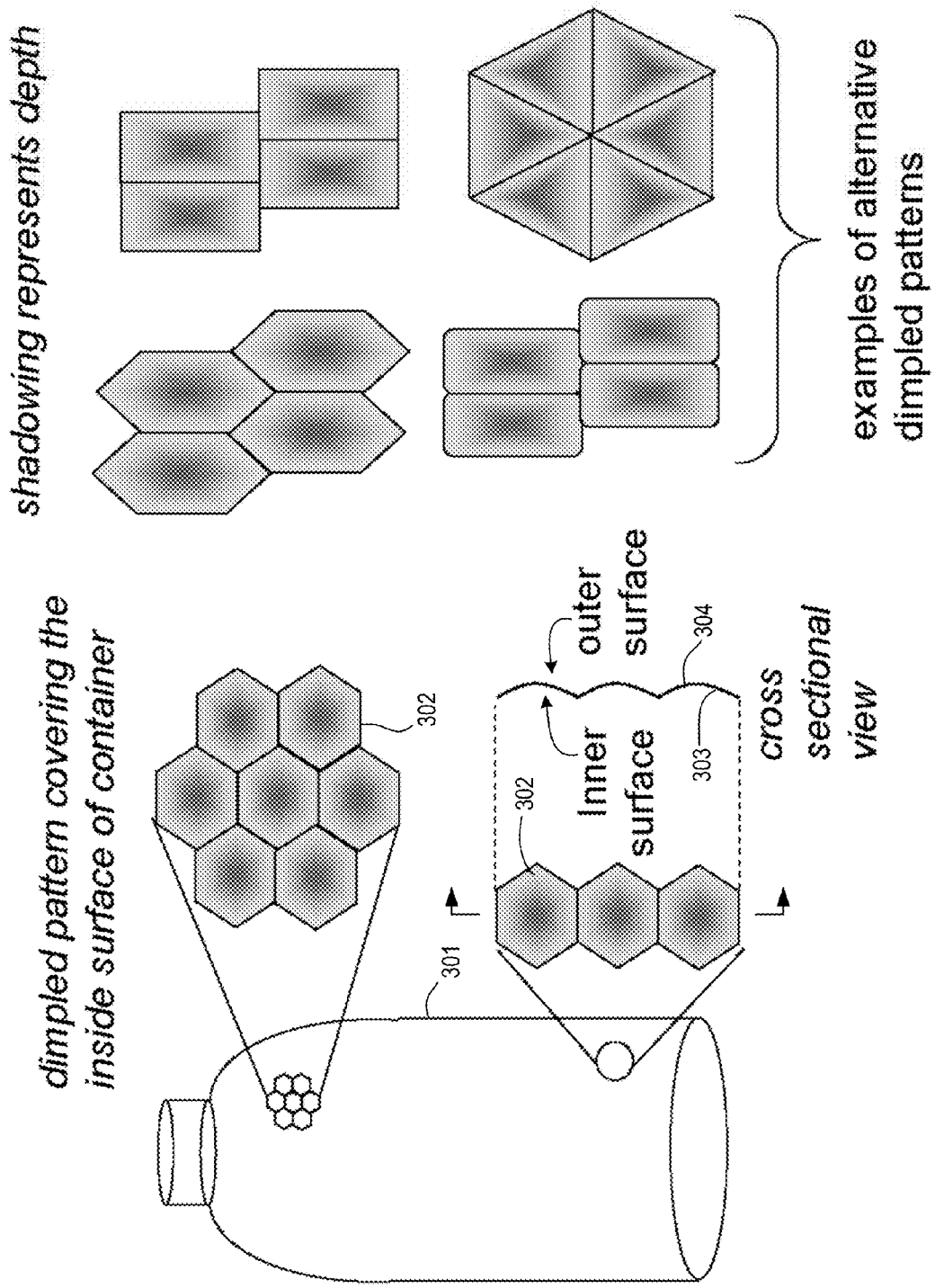

FIG. 1F4 is a view of a face 20ff of a partition 12ff of a can similar to can 10f, and taken from a location similar to that from which the view of FIG. 1F3 was taken. Face 20ff similar to face 20f, except that each of linear protrusions 15f is replaced by multiple discontinuous linear protrusions 15ff separated by interruptions 18ff. Each of linear protrusions 15ff can extend from face 20ff by a height of, e.g., 100 nm to 5 mm. Linear protrusions 15ff can be uniform in length, width, height and other characteristics, or various of linear protrusions 15ff may differ in on one or more dimensions or other characteristics. Interruptions 18ff may similarly be uniform or may vary. Linear protrusions 15ff and interruptions 18ff can be arranged in a regular pattern as shown or may have an irregular vertical and/or horizontal distribution.

FIG. 1G1 is a cross-sectional side view of a beverage container can 10g according to another embodiment. FIG. 1G2 is a top cross-sectional view of can 10g taken from the location shown in FIG. 1G1, FIG. 1G3 is a side cross-sectional view, taken from the location indicated in FIG. 1G1 and omitting the outer walls of can 10g, showing the face 20g of partition 12g inside of passage 14g. Can 10g is similar to can 10f of FIG. 1F1, except that face 20g include vertical linear protrusions 19g. Linear protrusions 15g are oriented in directions that are generally parallel to a direction of primary flow through passage 14g when beverage is drained from the remainder of main volume 13g via outlet 11g. The number, size, shape, distribution, continuity and other aspects of vertical linear protrusions 19g can vary in ways similar to the possible variations of horizontal linear protrusions 15f and 15ff discussed in connection with FIGS. 1F1 through 1F4.

FIG. 1H1 is a cross-sectional side view of a beverage container can 10h according to another embodiment. FIG. 1H2 is a top cross-sectional view of can 10h taken from the location shown in FIG. 1H1. FIG. 1H3 is a side cross-sectional view, taken from the location indicated in FIG. 1H1 and omitting the outer walls of can 10h, showing the face 20h of partition 12h inside of passage 14h. Can 10h is similar to can 10f of FIG. 1F1 and to can 10g of FIG. 1G1, except that face 20h includes both horizontal linear protrusions 15h (oriented in directions that are generally perpendicular to a direction of primary flow through passage 14h) and vertical linear protrusions 19h (oriented in directions that are generally parallel to a direction of primary flow through passage 14h). The number, size, shape, distribution, continuity and other aspects of linear protrusions 15h and/or 19h can vary in ways similar to the possible variations discussed in connection with FIGS. 1F1 through 1G3.

FIG. 1I1 is a cross-sectional side view of a beverage container can 10i according to another embodiment. FIG. 1I2 is a top cross-sectional view of can 10i taken from the location shown in FIG. 1I1. FIG. 1I3 is a side cross-sectional view, taken from the location indicated in FIG. 1I1 and omitting the outer walls of can 10i, showing the face 20i of partition 12i inside of passage 14i. Can 10i is similar to can 10f of FIG. 1F1, to can 10g of FIG. 1G1 and to can 10h of FIG. 1H1, except that face 20i includes a first set of diagonal linear protrusions 21i (extending from upper left to lower right in FIG. 1I3 in a first set of directions that are neither perpendicular nor parallel to a direction of primary flow through passage 14i) and a second set of diagonal linear protrusions 22i (extending from upper right to lower left in FIG. 1I3 in a second set of directions that are neither perpendicular nor parallel to a direction of primary flow through passage 14i). The number, size, shape, distribution, continuity and other aspects of linear protrusions 21i and/or 22i can vary in ways similar to the possible variations discussed in connection with FIGS. 1F1 through 1H3.

In other embodiments, and similar to the embodiments of FIGS. 1C1 through 1D2, both sides of a passage can have linear protrusions such as are described in connection with FIGS. 1F1 through 1I3. Other embodiments include further variations and combinations of linear protrusions described in FIGS. 1F1 through 1I3. Still other embodiments may include curved linear protrusions, combinations of curved and straight linear protrusions, and/or combinations of linear protrusions and features such as bumps, indentations, etc.

The features described in connection with FIGS. 1A1-1I3 can be combined in different manners and/or can be combined with other surface features, partitions, and/or other features inside the container. In general, increasing surface area for bubble nucleation will lead to more bubbles and adding obstructions will slow the rise of bubbles. In some embodiments in which a container is a bottle, the passage formed by a partition in FIGS. 1A-1I3 could be the passage of a bottle neck. A length, inner volume and/or other features of the neck could be varied so as to affect bubble creation and/or movement.

Because the physical properties of bubbles like size, shape, quantity and rate of bubble release are interrelated, they can be tuned together by modifying a container configuration. Some or all of these properties can also be varied by configuring a container so as to change depth at which bubble nucleation occurs. The rise of the bubbles coming out of the container will depend on features in the passage through which the carbonated liquid will exit the container. In some cases, beverage viscosity might be increased (e.g., by addition of sweetener syrup) or tiny particles can be suspended in (or designed to precipitate from) the beverage so as to increase bubble stability. Particle precipitation can be achieved by relying on decreased solubility of certain compounds under reduced pressure. Thus, such a compound might be fully dissolved in a beverage when pressurized in a sealed container. Once the container is opened, pressure is reduced and some of the compound would precipitate from solution.

In some embodiments, when modifying pre-existing containers so as to create functional surfaces that affect bubble size, quantity and/or other properties, certain considerations are relevant. To achieve consistency, it may be advantageous for as much of the beverage as possible to contact the functional surface or be affected by the functional surface. To control cost, it may also be advantageous for a functional surface to be consistent with current manufacturing processes (e.g., blow molding of polyethylene terephthalate (PET) preforms). It is also desirable for the container (as modified) to be safe, e.g., to present no choke hazards or toxic substances.

Some embodiments include beverage containers that improve flow dynamics of a beverage through the neck portion of a bottle or other container. This improvement in flow dynamics can be achieved by reducing viscous drag along the inner neck surface. The reduction in viscous drag can reduce the degree of "chugging" and the amount of gas released due to drag and turbulent flow. The end result can be improved flow and increased bubbles remaining in the beverage. If drinking directly from the bottle, the result can be improved beverage flow into the mouth. There will also be an increase in the amount of bubbles remaining in the beverage and thus, an improved mouth feel. The improved flow further reduces gas release in the mouth allowing for increased rate of consumption and an improved drinking experience.

In some embodiments these results are achieved through the use of "riblets," a micro-geometry of longitudinal grooves and/or ridges aligned with the direction of fluid flow. FIG. 2 shows one example of a bottle 100 having a neck section 101 with riblets 102 formed around the entire inner circumference of neck 101. Bottle 100 has a side wall 182, a top 181 (of which neck 101 is a part) and a bottom (not shown). Bottle 100 can be sealed at the outlet of neck 102 so as to contain a carbonated beverage in an interior volume of bottle 100, which outlet can then be opened to allow draining of the contained beverage from the internal volume via the opened outlet.

In the embodiment of FIG. 2, the riblets extend the entire length of neck 101, but this need not be the case in all embodiments. As shown in the inset portion of FIG. 2, the riblets may be longitudinal grooves that have approximately equal height-width dimensions. Variations in riblet dimensions can also be applied, however. Various patterns of riblets and other features that also can be utilized are described, e.g., in U.S. Pat. Nos. 5,069,403 and 4,930,729, both of which are hereby incorporated by reference in their entirety. The cross-sectional elevations of riblets (the peak to valley separation, which can be the height of the riblet ridges and/or the depth of riblet grooves) can be in the range of 0.1 to 0.5 mm. Additional embodiments include ridges having ranges of dimensions that include, without limitation, those described in U.S. Pat. Nos. 5,069,403 and 4,930,729. Other patterns that can be incorporated into containers according to one or more embodiments include those described in U.S. Pat. Nos. 5,971,326 and 6,345,791, both of which are also hereby incorporated by reference in their entirety. FIG. 3 shows a neck portion 201 of a bottle according to some other embodiments, with the remainder of the bottle not shown. In the embodiment of FIG. 3, improved performance may be obtained by focusing riblets 202 with a direction that is 45 degrees to a primary flow direction 289 of the beverage flowing from the container interior through an opened outlet in a top of the neck. In other embodiments, riblets in a neck or other container portion may be arranged at different angles to a flow direction.

Riblets can be formed in any of various manners. For example, longitudinal ridges and/or grooves can be created by applying a negative pattern of the ridges and/or grooves to a surface of the portion of an injection mold preform forming the inner neck surface. The body of a container can be tapered into the neck so as to form a shallow angle, as the abruptness in this angle may encourage release of gas from a beverage being poured out of the bottle. Riblets can be tapered into the body portion of a container and/or can extend the full length of the container.

As indicated above, viscous drag can have undesirable effects relative to the release of bubbles from a carbonated beverage. When a beverage is consumed, particularly when consumed directly from a bottle or other container, the container is tilted repeatedly such that the beverage flows back and forth across the inner surface of the container. The viscous drag across the surface of the container causes release of gas from the beverage. The release of gas reduces the content of gas in the beverage over time, and the beverage thereby becomes flat faster than it might if the beverage container remained stationary.

Some embodiments address viscous drag over interior regions of a beverage container in addition to (or instead of) the neck portion. At least some such embodiments also use micro-geometry surface texture to reduce viscous drag at the container-beverage boundary layer. In one embodiment, a beverage container has a dimpled interior surface such that the dimples form a concave surface at the beverage interface. This is shown in FIG. 4A. In FIG. 4A, a bottle 301 has a pattern of hexagonal dimples 302 over substantially all of the interior surface. Bottle 301 has a side wall, a top (having a neck) and a bottom. Bottle 301 can be sealed at the outlet of the neck so as to contain a carbonated beverage in an interior volume of bottle 301, which outlet can then be opened to allow draining of the contained beverage from the internal volume via the opened outlet.

For convenience, only a portion of dimples 302 are shown. As shown in the enlarged cross-sectional view of a lower portion of bottle 301, each dimple 302 can have a concave inner surface 303 and a convex outer surface 304. FIG. 4B shows examples of additional dimple shapes and patterns that can be used. The number of dimples can range from about 80-160 (e.g., about 120) per square inch (per 6.45 square cm), although various other sizes and alternative configurations are possible. Examples of alternative dimensions include but are not limited to those described U.S. Pat. No. 5,167,552, which patent is hereby incorporated by reference in its entirety. The depth of the dimples range may range from about 0.1 to about 0.5 mm, e.g., about 0.1 to 0.15 mm, though other depths and/or ranges of depths can be used.

In additional embodiments, dimples similar to those indicated in FIGS. 4A and 4B could be oriented in a reverse manner. In particular, dimples could be configured such that the dimples have a convex inner surface and a concave outer surface. Dimples could be located throughout substantially all of a container or in a single region of a container. For example, some embodiments can include a container in which dimples are only located in a shoulder region, while other embodiments might include a container in which dimples are only located in a girth region. In still other embodiments, dimples may be located in multiple discrete clusters of dimples, with a dimple cluster separated from another dimpled cluster by undimpled container wall material. Various cluster patterns (e.g., a hexagonal soccer ball pattern) and/or combinations of patterns could be used.

Embodiments such as are shown in FIGS. 4A and 4B can be created using blow mold techniques by including a pattern corresponding to the desired dimple pattern. If the pattern is formed from the outer surface of the container contacting the blow mold, it may be useful to alter the size and/or detail of the pattern so as to accommodate some loss of fine detail and/or resolution on the interior surface of the molded container.

Figure 5:
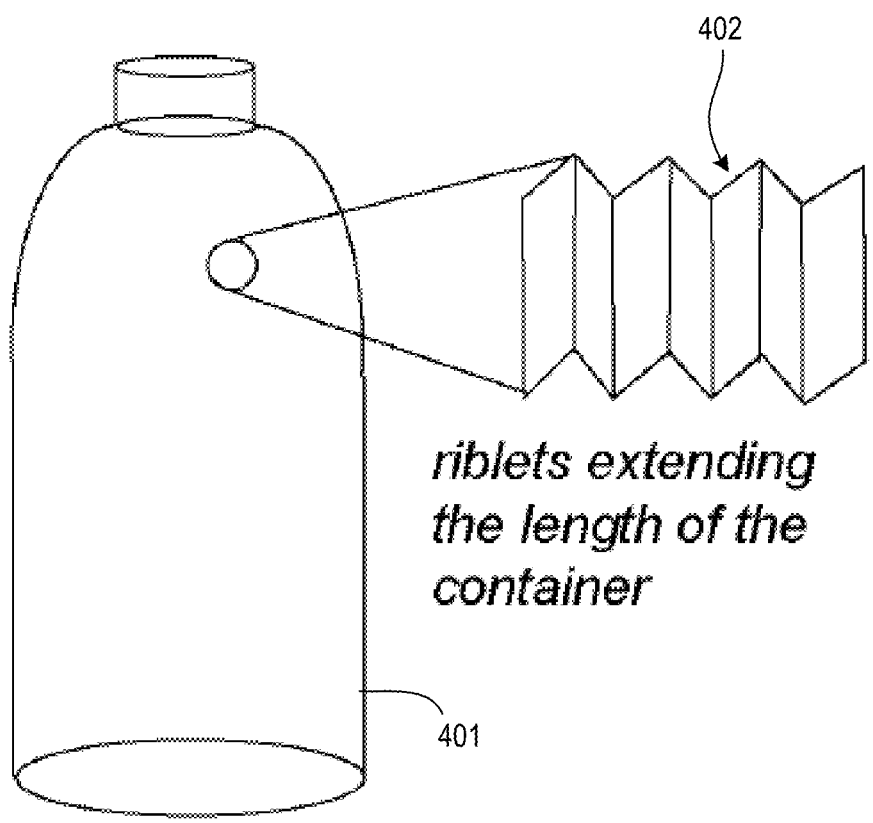
FIG. 5 shows a bottle according to some embodiments having riblets that extend the length of the bottle interior.

Additional embodiments use viscous drag reducing riblets on inner surfaces of a beverage container instead of (or in addition to) inner surfaces of a neck region. Such riblets can take the form of riblets running the length of the container as shown in FIG. 5. Specifically, FIG. 5 shows one example embodiment of a bottle 401 having riblets 402 that extend the length of the bottle interior. Bottle 401 has a side wall, a top (having a neck) and a bottom. Bottle 401 can be sealed at the outlet of the neck so as to contain a carbonated beverage in an interior volume of bottle 401, which outlet can then be opened to allow draining of the contained beverage from the internal volume via the opened outlet. For simplicity, only a portion of the riblets 402 are shown. FIGS. 6-11 show embodiments in which a pattern of riblets is formed on an interior container surface as a micro-geometry surface texture pattern. In the embodiments of each of FIGS. 6-11, the riblets can be formed on a bottle or other container having a side wall, a top (having a neck) and a bottom. The bottle or other container can be sealed at the outlet of the neck so as to contain a carbonated beverage in an interior volume of the container, which outlet can then be opened to allow draining of the contained beverage from the internal volume via the opened outlet.

In the embodiments of FIGS. 6-11, the ridges (peaks) of some riblets may be aligned with the grooves (troughs) of other riblets, effectively forming a micro-geometry surface texture pattern of a series of discontinuous individual riblets. The patterns of FIGS. 6-11 may to a degree mimic the placoid scales of sharks. The micro-geometry of placoid scales reduces the viscous drag of a shark through water and allows a shark to swim with greater speed. The embodiments of FIGS. 5-11 may be "two-way", i.e., they may reduce viscous drag in both longitudinal directions such that the same effect is observed whether the beverage is tilted down to pour or up to return the beverage to a stationary position in the container.

Figure 6:
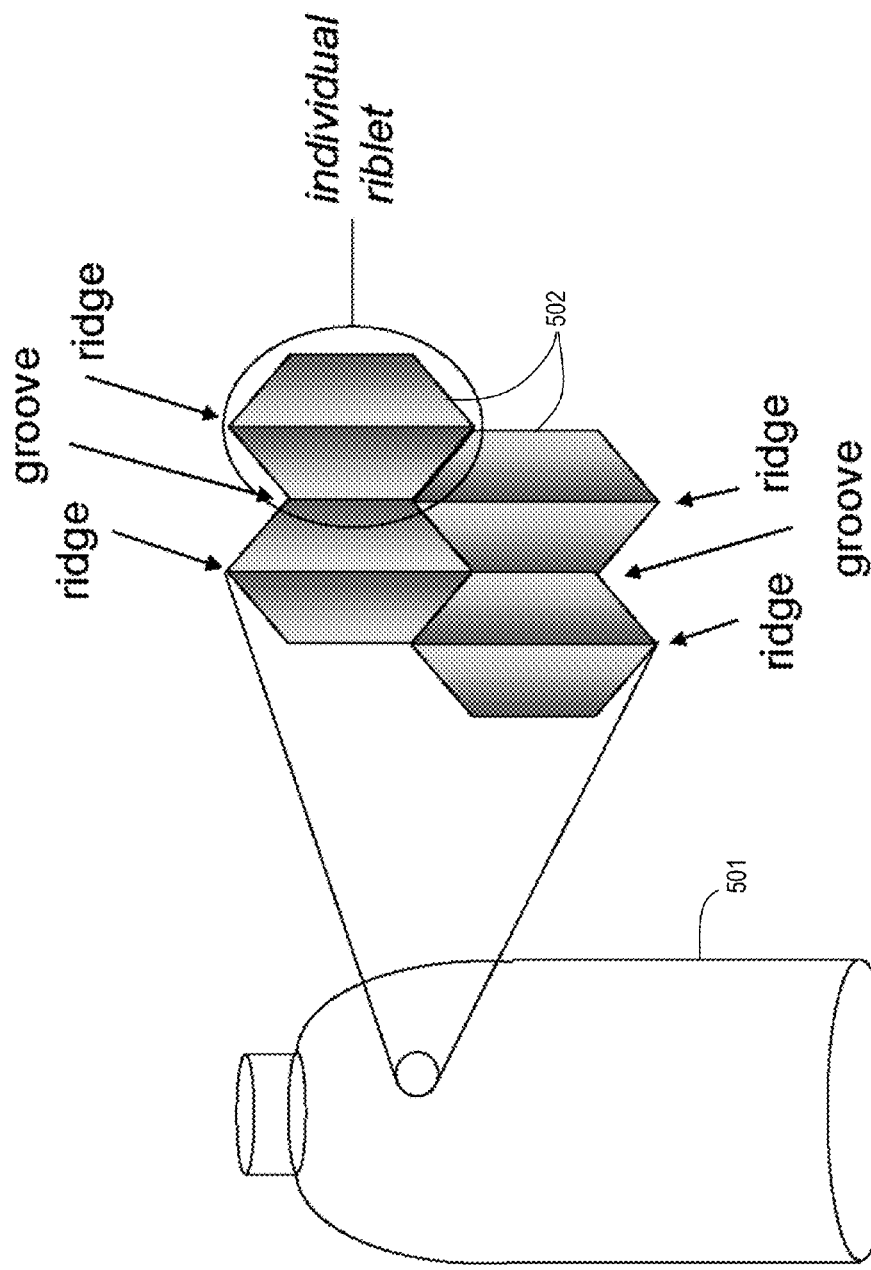
FIGS. 6-11 show embodiments in which patterns of riblets are formed on the interior surfaces of containers.

FIG. 6 shows an example of a bottle 501 having a pattern of riblets 502 formed on the inner surface of the bottle. In the example of FIG. 6, the riblet pattern is a microgeometry pattern in which circumferential rows of riblets are offset so that ridges of riblets in one row are aligned with grooves of ridges in an adjacent row. Although only a portion of the riblet pattern is shown in FIG. 6, the pattern may extend over the entire inner surface of bottle 501.

Figure 7:
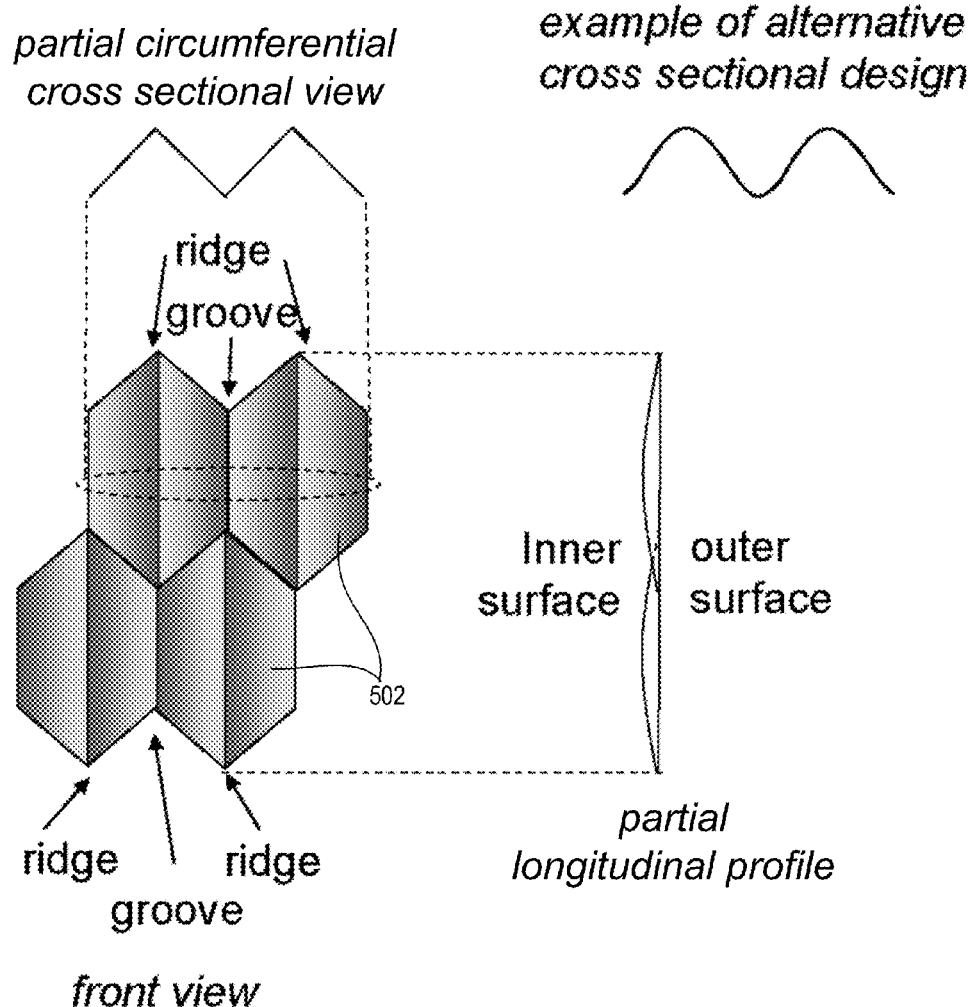

FIG. 7 shows additional details of the pattern of riblets 502 of bottle 501. As seen in the partial circumferential cross-sectional view, the riblets have a relatively sharp angular cross section. As seen in the partial longitudinal profile view, riblet ridges on the interior of bottle 501 are slightly bowed along their length. Also shown in FIG. 7 is an alternative cross-sectional profile for another embodiment in which riblet ridges and grooves are more rounded.

Figure 8:
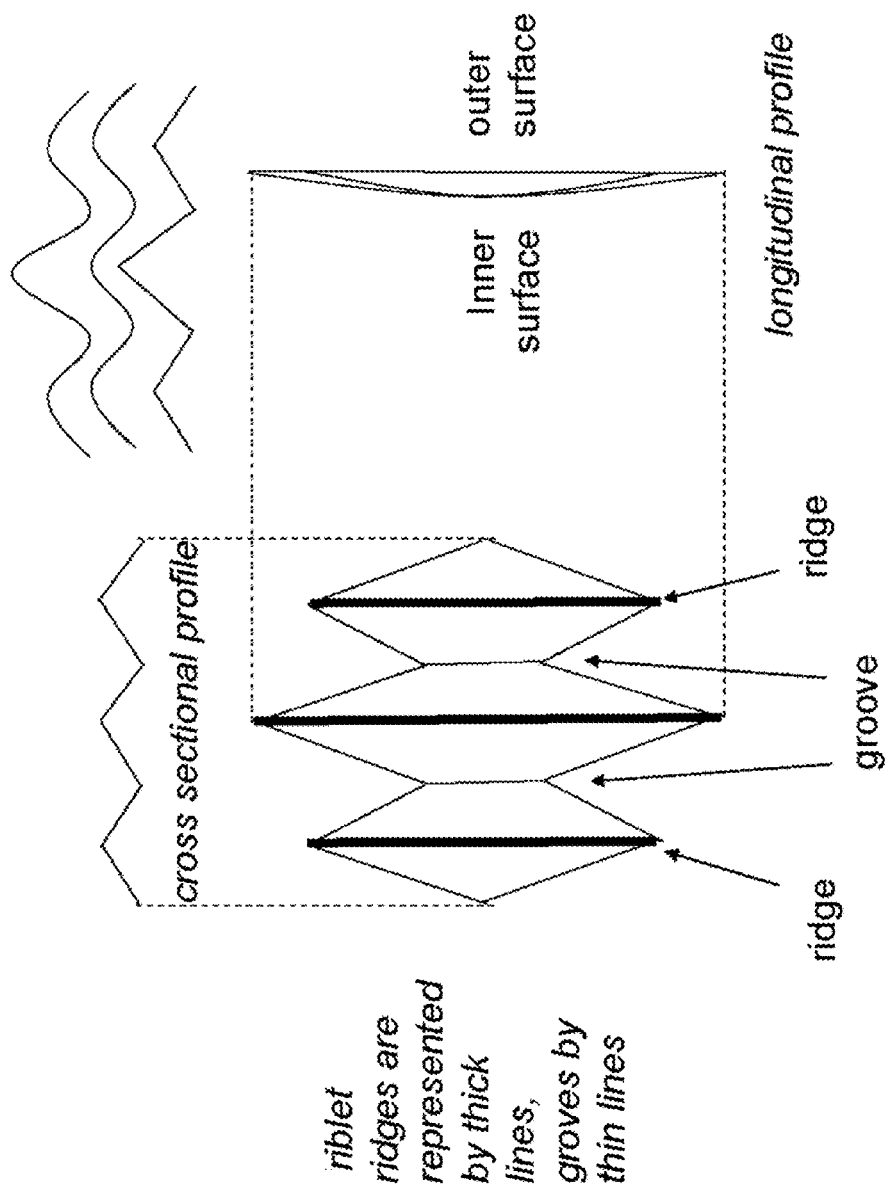
Figure 9:
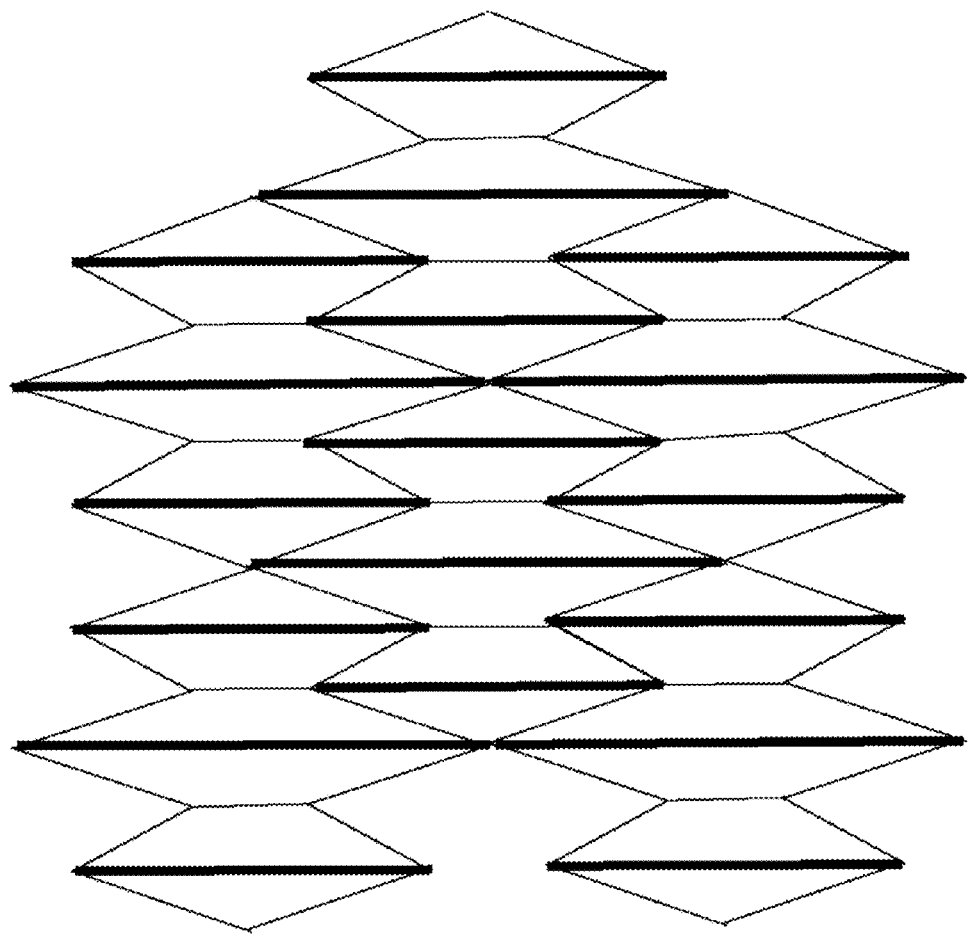
Figure 10:
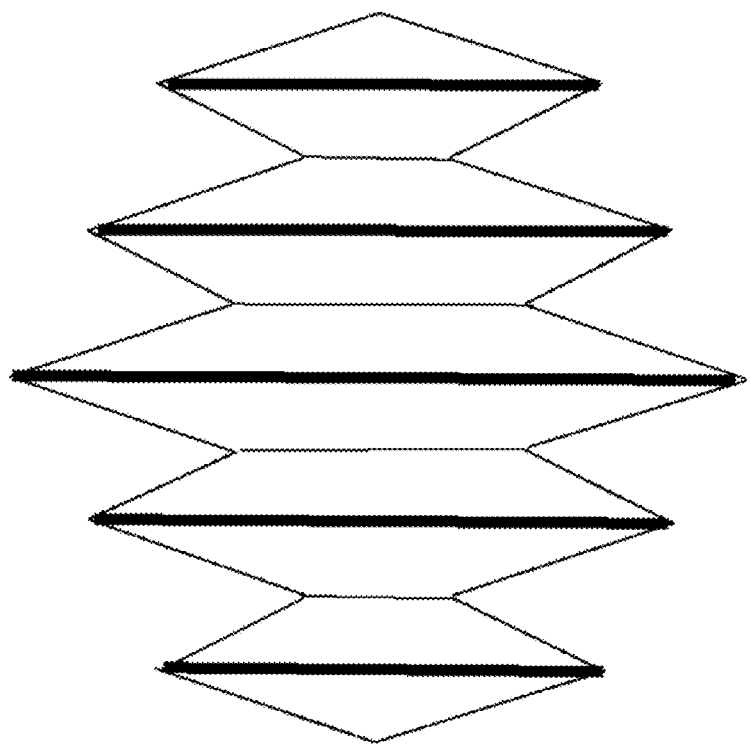
Figure 11:
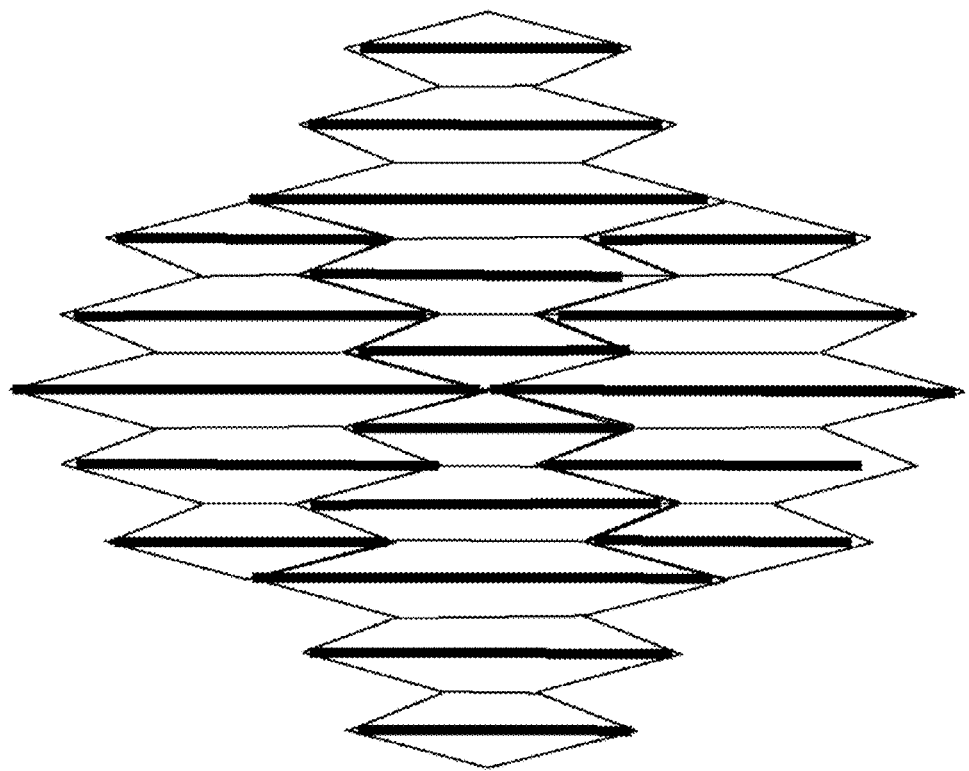

FIGS. 8-11 shows additional examples of alternative riblet patterns. Although each of FIGS. 8-11 only shows a small section of example patterns, such patterns can extend over the entire inner surface of a bottle or other container. FIG. 8 shows a pattern similar to that of FIG. 7, but in which adjacent riblets have different lengths. The upper right corner of FIG. 8 shows a further modification in which the riblet ridges and grooves are more rounded and/or in which some riblets have heights that are larger than heights of adjacent riblets. FIG. 9 shows a pattern of a group of riblets such as those of FIG. 8. FIG. 10 shows a further variation on the riblet pattern of FIG. 7. In the pattern of FIG. 10 there are at least three different lengths of riblets. FIG. 11 shows a pattern of a group of riblets such as those of FIG. 10.

Ridge and groove patterns can have additional configurations in other embodiments. The heights of ridges in embodiments of FIGS. 5-11 can be the same as the example heights provided in connection with FIG. 2 (e.g., approximately 0.1 to 0.5 mm). The lengths of ridges in the embodiments of FIGS. 5-11 may be in the range of about 0.5 to about 1.5 mm, although other lengths can be used.

Embodiments such as are shown in FIGS. 5-11 can also be created using blow mold techniques by including a pattern corresponding to the desired riblet pattern. If the pattern is formed from the outer surface of the container contacting the blow mold, it may be useful to alter the size and/or detail of the pattern so as to accommodate some loss of fine detail and/or resolution on the interior surface of the molded container and so as to take account of the thickness of material between a mold and inner surface.

In some embodiments, a bottle, flask or other carbonated beverage container has one or more bubble-forming structures formed on a bottom surface or other surface. Because sharp edges can stimulate bubble formation and act as nucleation sites, inclusion of such features in a container can promote formation of bubbles at a desired rate and of a desired size. FIGS. 12A1-12E2 are partially schematic drawings of beverage containers, according to at least some embodiments, having such bubble-forming structures. Each of FIGS. 12A1-12E2 relates to one of bottles 601*a*-601*e*, with each of bottles 601 having a side wall, a top (having a neck) and a bottom. Each of bottles 601 can be sealed at the outlet of the neck so as to contain a carbonated beverage in an interior volume of the bottle, which outlet can then be opened to allow draining of the contained beverage from the internal volume via the opened outlet. For convenience, bottles 601 (and bottles in other drawing figures) are shown with a flat bottom. However, bottles according various embodiments can include bottoms that are concave when viewed from an exterior, bottles with petaloid bottoms, and bottoms with other shapes.

Although FIGS. 12A1-12E2 show bottles as beverage containers, other embodiments may include similar bubble-forming structures in other types of containers. Moreover, other embodiments may include structures similar to those of FIGS. 12A1-12E2, but located at different positions on a container bottom and/or located at other positions within the container (e.g., a side wall). Still other embodiments may include multiple bubble forming structures of the types shown in one or more of FIGS. 12A1-12E2 and/or combinations of different types of bubble forming structures.

In the embodiments of FIGS. 12A1-12E2, bubble forming structures include spires or other structures having sharp points or edges. In some cases, two, three or more sharp points can be placed sufficiently close to one another such that bubbles form on each of the points and then join into larger bubbles. This may permit control of bubble size by varying the number points and their relative distance from one another.

FIG. 12A1 shows a bottle 601*a* according to one embodiment. FIG. 12A2 is an enlarged cross-sectional view of bottle 601*a* taken from the location indicated in FIG. 12A1. The bottom 602*a* of bottle 601*a* includes raised portions 603*a* and 606*a* that terminate in sharp points 604*a* and 605*a*.

In some embodiments, points 604*a* and 605*a* may instead be sharp edges of a crater-like depression 607*a* formed in a raised portion of bottom 602*a*.

FIG. 12B1 shows a bottle 601*b* according to another embodiment. FIG. 12B2 is an enlarged cross-sectional view of bottle 601*b* taken from the location indicated in FIG. 12B2. The bottom 602*b* of bottle 601*b* includes two raised portions 603*b* and 606*b* that terminate in sharp points 604*b* and 605*b*. Unlike raised portions 603*b* and 606*b* of bottle 601*b*, however, raised portions 603*b* and 606*b* join bottom 602*b* along sharp corners 608*b* and 609*b* that can also promote bubble formation. Another sharp edge is in the bottom of depression 607*b*. In some embodiments, peaks 604*b* and 605*b* may instead be sharp edges of a crater-like depression formed in a raised portion of bottom 602*b*.

FIG. 12C1 shows a bottle 601*c* according to another embodiment. FIG. 12C2 is an enlarged cross-sectional view of bottle 601*c* taken from the location indicated in FIG. 12C1. FIG. 12C3 is a further enlarged plan view of the bottom 602*c* of bottle 601*c* taken from the location indicated in FIG. 12C2. Bottle 601*c* includes three spires 603*c*-605*c* formed on bottom 602*c*. Spires 603*c*-605*c* can be solid and terminate in points, can be hollow (or partially hollow) and have sharp circumferential edges at their tips, or may have other configurations. Although each of spires 603*c*-605*c* is of roughly the same height and shape, other embodiments include spires of differing heights and/or differing shapes. More than three spires can be included.

FIG. 12D1 shows a bottle 601*d* according to another embodiment. FIG. 12D2 is an enlarged cross-sectional view of bottle 601*d* taken from the location indicated in FIG. 12D1. FIG. 12D3 is a further enlarged plan view of the bottom 602*d* of bottle 601*d* taken from the location indicated in FIG. 12D2. Bottle 601*d* is similar to bottle 601*c*, except that the bottom 602*d* of bottle 601*d* includes three taller spires 603*d* and nine shorter spires 604*d*. Spires 603*d* and spires 604*d* can be solid and terminate in points, can be hollow (or partially hollow) and have sharp circumferential edges at their tips, or may have other configurations. Other embodiments may include additional (or fewer) spires, may include spires having heights different from those of spires 603*d* and 604*d*, may include spires of differing shapes, may include different combinations of spire height and shape, etc.

Spires such as those in FIGS. 12C1 through 12D3, as well as spires, raised portions, projections and/or other surface features according to other embodiments, can be scratched, sandblasted or otherwise abraded or treated so as to create a roughened surface to increase nucleation sites. Spires, raised portions, projections and/or other surface features, whether or not roughened, can also be treated with silicone spray or another agent so as to modify the wetting characteristics of a surface and facilitate faster bubble release.

FIG. 12E1 shows a bottle 601*e* according to another embodiment. FIG. 12E2 is an enlarged cross-sectional view of bottle 601*e* taken from the location shown in FIG. 12E1. Bottle 601*e* includes a projection 603*e* extending from bottom 602*e*. Projection 603*e* includes three sharp points 604*e* formed in an end of projection 603*e*. Other embodiments may include additional projections and/or projections with additional (or fewer) points.

The number, size, shape, distribution, and other aspects of spires, raised portions, projections and/or other surface features can vary in numerous ways in addition to those explicitly described herein.

Some embodiments include a bubble catching structure. FIG. 13A1 shows a bottle 701*a* according to one such embodiment. FIG. 13A2 is an enlarged cross-sectional view of bottle 701a taken from the location shown in FIG. 13A1. Each of FIGS. 13A1-13C2 relates to one of bottles 701a-701c, with each of bottles 701 having a side wall, a top (having a neck) and a bottom. Each of bottles 701 can be sealed at the outlet of the neck so as to contain a carbonated beverage in an interior volume of the bottle, which outlet can then be opened to allow draining of the contained beverage from the internal volume via the opened outlet. Bottle 701a includes dome-shaped bubble catching structure 703a anchored to the bottom 702a. For convenience, tabs or other structures connecting bubble catching structure 703a to bottom 702a are not shown. Bubble catching structure 703a forms a volume 704a that is partially separated from the main volume 707a. Except for regions around the edges of bubble catching structure 703a and an orifice 705a in bubble catching structure 703a, liquid (and bubbles) cannot pass between regions 704a and 707a. As also shown in FIG. 13A2, orifice 705a is located at or near the highest portion of the dome of bubble catching structure 703a. When bottle 701a is in an upright configuration, bubbles trapped under structure 703a can only escape into main volume 707a through orifice 705a, but liquid in bottle 701a can readily reach region 704a through the openings at the edges of structure 703a.

The upper surface 708a of structure 703a is smooth so as to minimize bubble formation. However, the underside 706a of structure 703a and/or bottom 702a contain numerous scratches, sharp edges, etc. to stimulate bubble formation. Bubbles forming under structure 703a will join into larger bubbles prior to (or during) escape through orifice 705a to region 707a.

FIG. 13B1 shows a bottle 701b according to another embodiment. FIG. 13B2 is an enlarged cross-sectional view of bottle 701b taken from the location shown in FIG. 13B1. Bottle 701b is similar to bottle 701a, except that dome-shaped bubble catching structure 703b is not fixed to bottom 702b. Instead, structure 703b can move up and down within volume 707b. Thus, region 704b is not of fixed size. The upper surface 708b is smooth. Bottom surface 706b (and/or bottom 702b) includes scratches, sharp edges and/or other surface features to promote bubble formation. Bubbles formed under structure 703b gather and escape through orifice 705b, with orifice 705b located at or near the highest portion of the dome of bubble catching structure 703b. In some embodiments, formation of sufficiently large bubbles under structure 703b may permit structure 703b to move up and down within main volume 707b in a periodic manner. In some embodiments, structure 703b may be stabilized by lowering its center of gravity (e.g., attaching a weight to the underside) and/or by making the sides of structure 703b fit relatively close to the inside walls of bottle 701b. In the embodiments of FIGS. 13A1-13B2, the size of bubbles entering the main volume of the bottle can be controlled based on the diameter of the orifice.

FIG. 13C1 shows a bottle 701c according to another embodiment. FIG. 13C2 is an enlarged cross-sectional view of bottle 701c taken from the location shown in FIG. 13C1. Bottle 701c includes a structure 703c that is able to move freely within main volume 707c. One or both faces of structure 703c can have scratches, sharp edges and/or other surface features to promote bubble growth. Structure 703c lacks an orifice and is permitted to rotate freely. Bubbles formed on the underside of structure 703c escape upwards when structure 703c is tilted upward. Structure 703c can be symmetric or non-symmetric, can have the shape shown, or can have other shapes. In some embodiments, structure 703c has a width ($W_w$) that is greater that the width (A) of the neck opening of bottle 701c and a length ($L_w$) that is less than a width (B) of the bottle 701c interior. More than one structure 703c could be included in bottle 701c.

Although FIGS. 13A1-13C2 show embodiments in which the beverage container is a bottle, structures such as are shown in FIGS. 13A1-13C2 can be used in other embodiments where a container is a can, a reusable or disposable cup, etc.

In some embodiments, a beverage container shape can be configured so as to increase internal surface area and/or to increase the number of internal corners, edges or other surface features that may help promote nucleation. For example, a container could be formed with a through hole, an indentation, a notch, etc. Examples of such bottles are shown in FIGS. 14A1-14D. Each of the bottles in FIGS. 14A1-14D includes side walls, a top (having a neck) and a bottom. Each of those bottles can be sealed at the outlet of the neck so as to contain a carbonated beverage in an interior volume of the bottle, which outlet can then be opened to allow draining of the contained beverage from the internal volume via the opened outlet. As an additional advantage, container configurations such as are shown in FIGS. 14A1-14D can also be used to create distinctive appearances for product marketing or other purposes. FIG. 14A1 shows a bottle 800 having two sealed through-holes 801 and 802 formed therein. FIG. 14A2 is a cross-sectional view of bottle 800 from the location indicated in FIG. 14A1. As seen in FIG. 14A2, each of holes 801 and 802 provides an external passage through the body of bottle 800 without exposing the bottle interior. FIG. 14B shows a bottle 810 having a star-shaped sealed through hole 811. FIG. 14C is a lengthwise cross-sectional view of a bottle 815 having multiple notches 816 that project inward to the bottle interior. FIG. 14D is a lengthwise cross-sectional view of a bottle 825 having a pair of notches that project inward. Protrusions 827 extend from the interior surfaces of notches 826. In still other embodiments, the entire outer profile of the bottle could be custom shaped (e.g., a long serpentine shape, a star shape) so as to increase internal surface area and/or internal nucleation features.

Beverage containers according to various embodiments can be formed using any of various techniques. For example, nucleation sites can be formed on interior regions of a plastic beverage bottle during a blow molding process. As indicated above, a mold used to form a plastic bottle can include protrusions, recesses or other features that create external features on the bottle outer surface. These external features will then have corresponding features on internal surfaces of the bottle (e.g., creating a dent in the bottle exterior will create a bump in the bottle interior).

As another example, internal surface features can be formed on a plastic bottle preform using a core rod having surface features corresponding to the desired surface features. Upon stretching and blowing of the preform, the internal surface features of the preform will become internal surface features of the plastic bottle. FIG. 15A is a front view of a core rod 901 according to one embodiment. FIG. 15B is a cross-sectional view of the front end of core rod 901 from the location indicated in FIG. 15A. Rod 901 includes numerous ultra fine channels 902 formed in the curved front face 903 of rod 901. In operation, core rod 901 is placed into a mold chamber. Molten PTE or other material is then injected into the space between rod 901 and the chamber walls so as to create a preform that can later be used to blow mold a beverage container. During the injection molding process, molten material flows into the channels 901 to create pointed protrusions on a portion of the preform that will correspond to the interior bottom surface of the resulting plastic bottle. The sizes (diameter and/or depth) of each channel 902 can be varied in different embodiments, and all channels need not have the same dimensions. The number and distribution of channels can likewise be varied in other embodiments. In some embodiments, one or more channels at the frontmost tip of end 903 may be omitted so that the resulting preform will have a region without protrusions so as to better accommodate a stretch rod during the blow molding process. In still other embodiments, a push rod used with a preform created with core rod 901 may have a concave cup-like end that fits over projections in the preform. The concave region of that end accommodates the projections without damaging them during the stretch blow molding process. A ring of the push rod end pushes against a portion of the preform surface surrounding the protrusions in the preform.

Figure 17A:
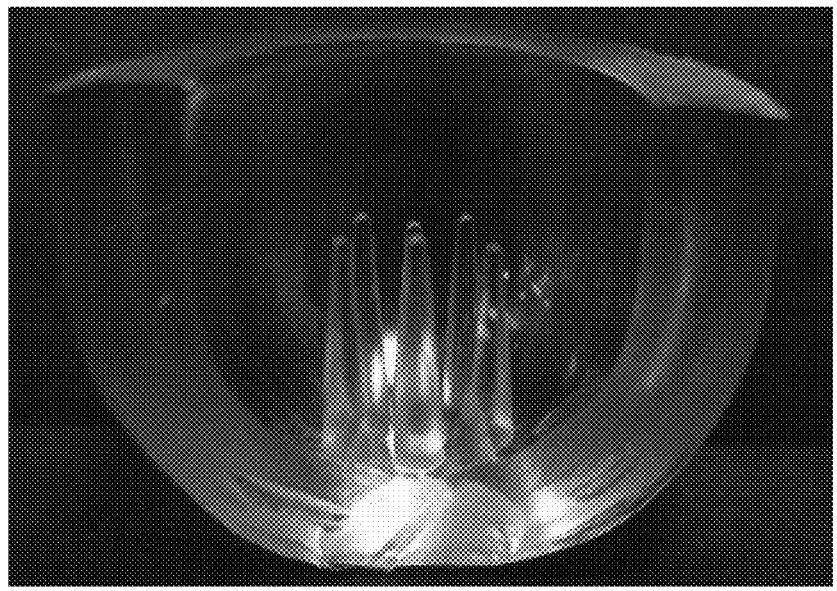
FIG. 17A shows a cross section of a preform created with a modified core rod.
Figure 17B:
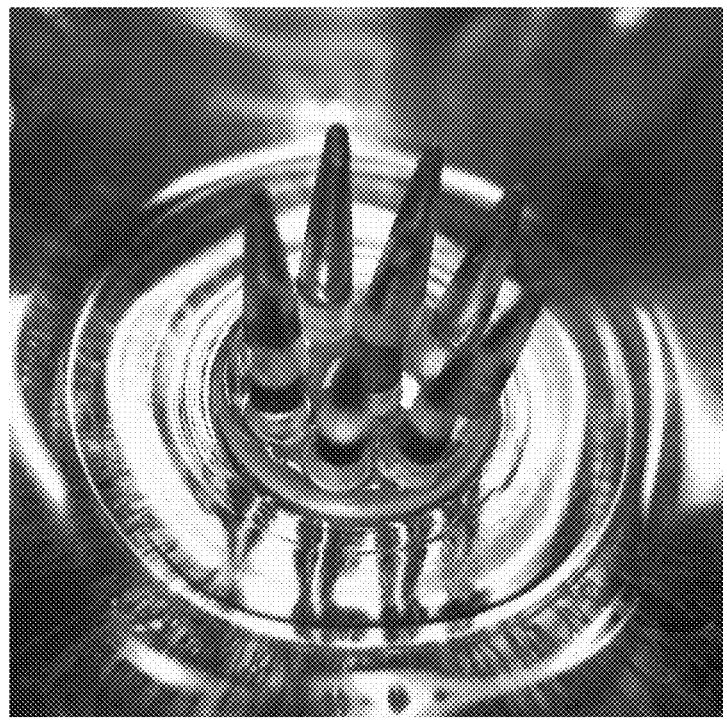
FIG. 17B shows the interior bottom of a bottle stretch blow molded from the preform of FIG. 17A.

FIG. 17A is a picture showing a cross section of a preform created with a core rod similar to core rod 901 of FIGS. 15A and 15B. However, the core rod used to create the preform of FIG. 17A only has nine channels. Those channels are wider than channels 902 of core rod 901 and are conically shaped. FIG. 17B is a picture of the interior bottom of a bottle stretch blow molded from the preform of FIG. 17A.

Internal surface features in a container can alternatively (or also) be created by modifying a stretch rod used to push against the bottom surface of a preform during blow molding. Such a stretch rod can be used to impart spikes or other projections, asperities, inclusions or other types of surface features on an interior base region of a blow molded bottle. A stretch rod could alternatively, or additionally, be used to impart a surface texture to a bottle interior base region. In addition to forming nucleation sites for use in control of bubble formation, textures and surface features formed on a bottle interior or exterior can be used to incorporate decorative features for aesthetic purposes.

FIG. 15C is a block diagram of steps in forming a plastic bottle having one or more internal surface features using a stretch rod having a modified tip. In step 991, a stretch rod having the modified tip is inserted into a plastic preform that has been sufficiently heated. The neck portion of the preform is secured relative to an axis of motion of the stretch rod (i.e., an axis that will also correspond to the longitudinal axis of the bottle to be formed). In step 992, the stretch rod is pushed against an inner bottom surface of the preform so as to force heated plastic of the preform into the cavities in the modified tip. In step 993, a gas (e.g., air) is blown into the stretched preform and the preform is expanded axially against the inner walls of the blow mold. This results in a bottle having bottom surface features that correspond to the surface features in the stretch rod tip. Different types of rod tips can be used to form various types of interior surface features in a blow molded container.

Figure 16:
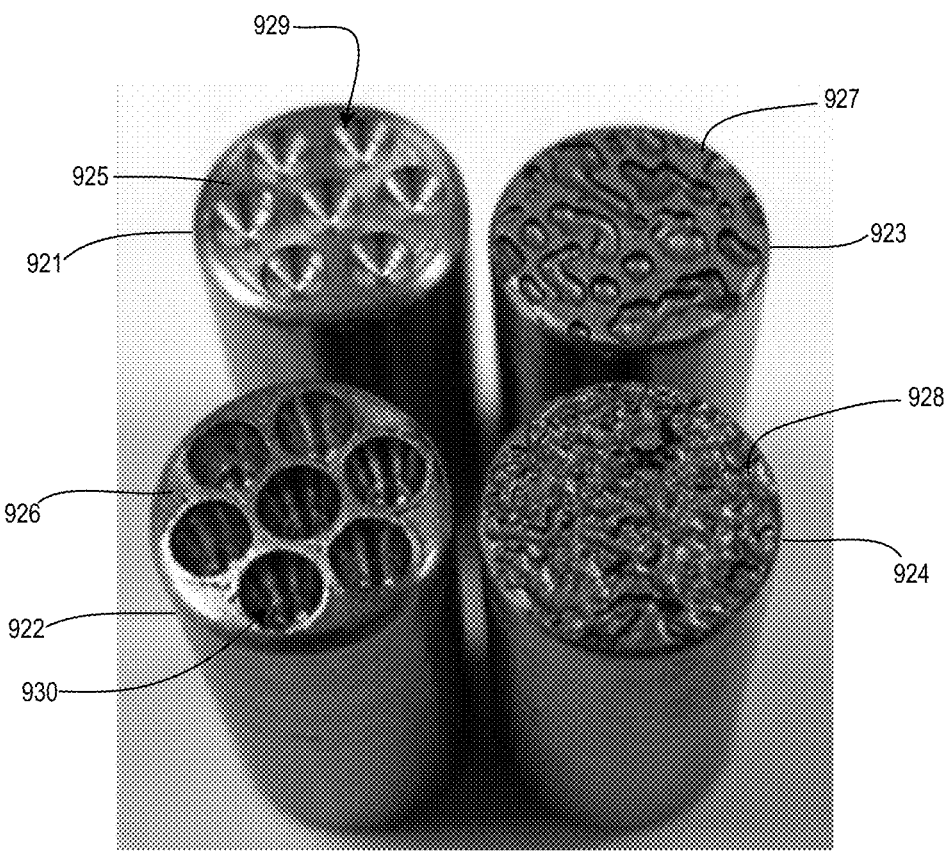
FIG. 16 are drawings of blow molding stretch rods according to some embodiments.

For example, FIG. 16 is a picture showing the ends of four stretch rods 921-924 according to some embodiments. Rod 921 has seven conical depressions 929 formed in its end face 925. Each of depressions 929 is approximately 0.05 inches deep. Rod 922 has seven conical depressions 930 formed in its end face 926. Each of depressions 930 is approximately 0.1 inches deep. Rods 923 and 924 have a plurality of irregularly shaped depressions formed in their respective end faces 927 and 928.

Test bottles were blown with each of the end rods shown in FIG. 16 using green plastic preforms. Processing adjustments were made to slow the molding machine so as allow temperature to equilibrate more thoroughly inside of the preforms, and to thus allow details to form more fully. The stretch rods were also adjusted to pin the preform material more tightly than in conventional blow molding so as to press preform material into the bottoms of the stretch rods. A flat surface in the base mold corresponding to the location against which the rod end presses is desirable.

FIG. 17C is a picture of an inside of a bottle blow molded with rod 921. In some cases, it may be easier to create high aspect ratio protrusions (such as are shown in FIG. 17B) using a modified core rod (such as described in connection with FIG. 17A) instead of a modified push rod similar to push rod 922.

All features of the bottles blow molded with rods 921-924 acted as nucleation sites. The rate of bubble release was controlled in accordance with bubble growth rates attributable to the respective surface features. FIGS. 17D and 17E show nucleation resulting from surface features similar to those shown in FIG. 17C.

Figure 18:
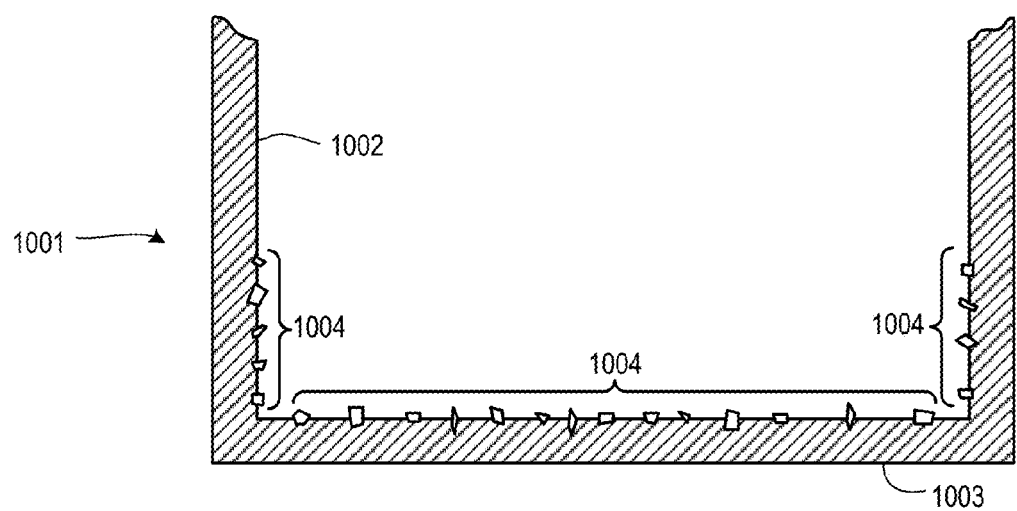
FIG. 18 is a cross-sectional view of a portion of a bottle according to another embodiment.

In other embodiments, nucleation sites can be formed in other manners. FIG. 18 is a cross-sectional view of a portion of a bottle 1001 according to one such embodiment. Bottle 1001 includes a bottom 1003 and a side wall 1002 (only a portion of which is shown), as well as a top (not shown) having a neck (also not shown). Bottle 1001 can be sealed at the outlet of the neck so as to contain a carbonated beverage in an interior volume of bottle 1001, which outlet can then be opened to allow draining of the contained beverage from the internal volume via the opened outlet.

Bottom 1003, side wall 1002 and the top of bottle 1001 are formed from a first material (e.g., PET or other plastic). Embedded in the interior surface of bottom 1003 and/or a lower portion of side wall 1002 are multiple discrete elements 1004. Elements 1004 are partially exposed to a beverage contained in bottle 1001. Although not shown in the cross-sectional view of FIG. 18, elements 1004 may distributed across the entire surface of bottom 1003 and around the entire circumference of bottle 1001 in the lower portion of side wall 1002. Each of elements 1004 is formed from a second material that can be different from the first material. For example, discrete elements 1004 can include embedded particles (e.g., sand-sized) of silica, of an inorganic material, of a plastic different from the first material plastic, of an inorganic material, etc. Other materials that can be embedded in or otherwise attached to a bottle interior surface, or otherwise placed into a bottle interior, can include wood fibers adhered to a bottle base, coffee filter material, food grade insoluble fibers, cellulose/PET fibers optimized for wicking characteristics and bubble texture control, fibrous meshes having air bubbles trapped therein to act as $CO_2$ bubble nucleation sites, semi-permeable membranes floating on a beverage surface and having pores size slightly smaller than the molecular dimension of $O_2$, and activated charcoal inclusions.

In some embodiments, side wall surface portions having embedded elements 1004 may extend further upward in the bottle (e.g., approximately half of the bottle height). In still further embodiments, only the interior bottom surface may have embedded elements. In yet other embodiments, only interior side wall surfaces may have embedded elements. Embedded elements can be arranged in multiple groupings separated by regions without embedded elements.

In still other embodiments, a bottom or other interior surface can be roughened by sand blasting, by cryogenic abrasion, etc. In still other embodiments, known techniques for creating a bottle with a foamed plastic layer can be modified to create a bottle with one or more foamed plastic regions in the bottle interior. Techniques for creating bottles with a foamed plastic layer are described, e.g., in U.S. Pat.

No. 7,588,810, in U.S. Pat. App. Pub. No. 20050181161, in U.S. Pat. App. Pub. No. 20070218231, in U.S. Pat. App. Pub. No. 20080251487, in U.S. Pat. App. Pub. No. 20090297748, and in International Pat. App. Pub. No. WO 2008/112024; each of these documents is incorporated by reference herein in its entirety.

With regard to beverage containers formed by any of various methods, various factors can be considered when attempting to increase effervescence. In general, a larger number of nucleation sites results in more bubble formation. With regard to geometry of nucleation sites, a high surface energy is desirable. This typically corresponds to a high aspect ratio (i.e., a large height:width ratio). Tall and slim structures (e.g., oblate similar to orzo pasta, needles) can be useful in this regard. The density of nucleation sites in a given area is also relevant. Larger bubbles may form from regions with increased nucleation site density, and larger bubbles may release and rise more quickly. The location of nucleation sites may also be relevant. It may sometimes be useful to place nucleation sites at the bottom of a container because potential energy associated with surface tension may be higher at the bottom base than in the bottle neck.

A larger number of spikes (or other type of projections) can cause more bubble release than fewer spikes (or other type of projections). Larger spacing between spikes/projections can also increase the number of bubbles released and/or decrease the sizes of released bubbles. The inverse relationship with spacing and number of spikes/projections also holds true.

Example 1

Figure 19:
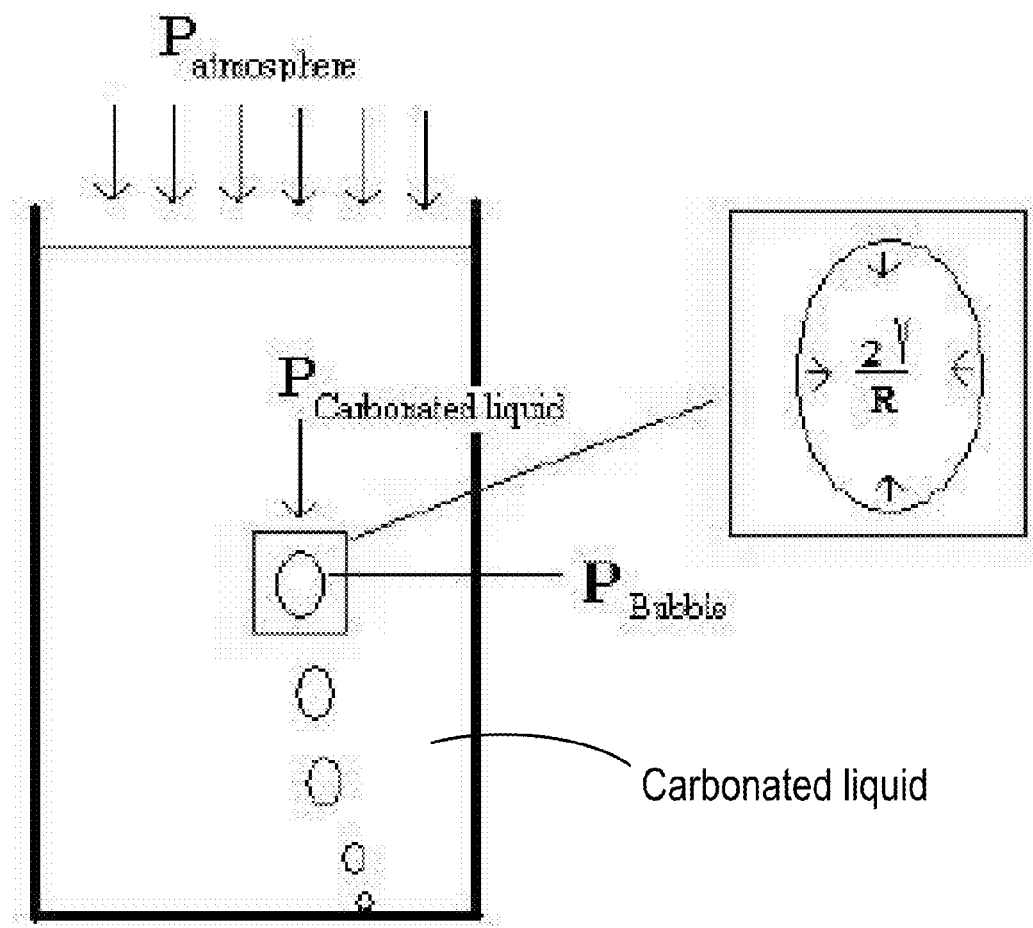
FIG. 19 shows the variation in size and pressure of a bubble rising inside a liquid.

The pressure inside of a bubble is represented by Equation 1:

$$P_{bubble}=P_{atm}+P_{carbonated\ liquid}+2Y/R \quad (Eq.\ 1)$$

where:
Y=surface tension of carbonated liquid
R=radius of pore
$P_{carbonated\ liquid}$=pressure exerted by the liquid above the bubble
$P_{atm}$=atmospheric pressure FIG. 19 shows the variation in size and pressure of a bubble rising inside a liquid. As can be deduced from Eq. 1, the equilibrium pressure inside the bubble is inversely proportional to the bubble size. The pressure inside the bubble is also dependent upon the surface tension of the carbonated liquid. As the bubble rises, the pressure $P_{carbonated\ liquid}$ decreases. Because the equilibrium pressure inside the bubble is dependent upon the pressure exerted by the carbonated liquid above the bubble, $P_{bubble}$ also decreases accordingly. This decrease in pressure is accommodated by an increase in the size of the bubble. In addition to this, with the rise of bubbles, the gas from the carbonated liquid surrounding the bubble also diffuses into the bubble because of pressure differences. What follows is a mathematical explanation of why extremely minute bubbles will not form without some surface bubble nucleation.

The shape of the bubble will tend towards spherical as the surface/volume ratio is lowest for this shape. But the bubble inside a liquid has to push the surrounding liquid while rising and therefore, in reality, has a shape that is slightly distorted. For the sake of simplicity in calculation, however, the shape is assumed to be spherical. Is further assumed that the bubble radius is R, surface tension of the liquid is Y, gas density is $\rho$, and F is free energy release achieved when 1 gram of gas is transferred from supersaturated solution into the bubble. The surface of the bubble will be $4\Pi R^2$. In order to create this much surface inside the liquid, the work to be done against the surface tension of the liquid is equal to $4\Pi R^2 Y$. The amount of gas in the bubble will be $(4/3)\Pi R^3 \rho$. The free energy release for one bubble would be $(4/3)\Pi R^3 \rho F$. Spontaneous gas evolution is possible only as long as $4/3\Pi R^3 \rho F > 4\Pi R^2 Y$, i.e., as long as $R\rho F > 3Y$. It is clear from the this relationship that, whatever (within interest) the values of $\rho$, F and Y, the term $R\rho F$ would be less than $3Y$ for sufficiently small values of R. And, as bubbles must be minute at the time of nucleation before they grow, extremely minute bubbles can not form simultaneously.

Assuming that supersaturated carbonated liquid would be in equilibrium with gas under a pressure P, it would tend to diffuse gas to a space where pressure is less than P. In a random nucleation event, there is a statistical chance that small and large (R) bubbles occur simultaneously, but they may not be sustained. It is the Gibbs Free energy balance of volume and surface area energies that will dictate whether these nuclei are thermodynamically stable enough to grow. Above a critical free energy, the nuclei can grow. From Eq. 1, it is evident that the pressure in bubble is greater than the surrounding liquid by 2Y/R (assuming pressure exerted by the carbonated liquid is negligible). Thus a bubble will grow only if the term 2Y/R is less than the surrounding pressure P. As at the time of nucleation, R has to be sufficiently small, the above condition can be satisfied by improbably great values of P only. Providing readily available surface for the nucleation of bubbles inside a carbonated liquid for a given volume of container can facilitate foaming.

CONCLUSION

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention.

The invention claimed is:

1. An article of manufacture, comprising:
   a container having an internal surface defining an internal volume;
   a carbonated liquid beverage sealed within the internal volume;
   a closed outlet located on the beverage container, the outlet configured for opening and positioned on the container so as to permit draining of the beverage from the internal volume through the outlet after opening of the outlet; and
   a baffle located within the beverage container, wherein the baffle is attached to portions of the internal surface and defines a passage separated from a remainder of the internal volume, wherein the passage has a volume less than the remainder of the internal volume, and
   a fluid path between the outlet and the remainder of the internal volume extends through the passage.

2. The article of manufacture of claim 1, wherein the fluid path is the only fluid path between the outlet and the remainder of the internal volume, and the fluid path extends through the passage.

3. The article of manufacture of claim 1, wherein the container comprises a metal can.

4. The article of manufacture of claim 3, wherein the baffle is vertically oriented when the can base is resting on a flat surface.

5. The article of manufacture of claim 1, wherein the passage comprises walls formed by a face of the baffle and a portion of the container internal surface, and wherein at least one of the passage walls comprises a plurality of surface features configured to perform at least one of the following operations upon opening of the outlet and draining of the beverage from the internal volume:
promoting nucleation, and
slowing movement of bubbles through the passage.

6. The article of manufacture of claim 5, wherein the surface features comprise at least one of short hair-like projections, small bumps, pits and surface indentations.

7. The article of manufacture of claim 5, wherein the surface features comprise linear protrusions, the linear protrusions comprising at least one of ribs, ridges or riblets.

8. The article of manufacture of claim 7, wherein the linear protrusions comprise discontinuous linear protrusions separated by interruptions.

9. The article of manufacture of claim 7, wherein the linear protrusions are oriented in a direction generally parallel to a direction of flow through the passage when the beverage is drained from the internal volume.

10. The article of manufacture of claim 7, wherein the linear protrusions are oriented in a direction generally perpendicular to a direction of flow through the passage when the beverage is drained from the internal volume.

11. The article of manufacture of claim 7, wherein the linear protrusions are oriented in directions generally at angles to a direction of flow through the passage when the beverage is drained from the internal volume, the angles being neither perpendicular nor parallel to the direction of flow.

12. The article of manufacture of claim 1, wherein:
the baffle is attached at a top of the container and extends down into the internal volume.

13. An article of manufacture, comprising
a container having a base, a sidewall and a top, wherein internal surfaces of the base, sidewall and top define an internal volume, and wherein at least the base internal surface is formed from a first material;
a carbonated liquid beverage sealed within the internal volume;
a closed outlet located on the container, the outlet configured for opening so as to permit draining of the beverage from the internal volume through the outlet after opening of the outlet; and
a plurality of discrete nucleating elements embedded in the internal base surface and exposed to the beverage, wherein
each of the discrete nucleating elements is formed from a second material, the second material is different from the first material,
each of the discrete nucleating elements is configured to promote nucleation upon opening of the outlet,
wherein the container is a bottle, the first material is a first plastic, the second material is a second plastic, and the discrete nucleating elements comprise particles of the second plastic.

14. The article of manufacture of claim 13, wherein the container is a bottle, the first material is plastic, the second material is silica, and the discrete nucleating elements comprise sand-sized particles.

15. The article of manufacture of claim 13, wherein the discrete nucleating elements further comprise insoluble fibers.

16. An article of manufacture, comprising:
a container having a base, a sidewall and a top, internal surfaces of the base, sidewall and top defining an internal volume;
a carbonated liquid beverage sealed within the internal volume; and
a nucleating structure located within the internal volume and extending upward from the internal surfaces of the base, the nucleating structure including a plurality of surfaces exposed to the beverage, at least one of the nucleating structure exposed surfaces having nucleation surface features thereon, the nucleation surface features comprising at least one of scratches or roughened regions,
wherein:
the container is a bottle;
the base internal surface is formed from a first material; and
the nucleating structure is formed from a second material that is different from the first material.

17. The article of manufacture of claim 16, wherein the nucleating structure comprises sharply pointed projections.

* * * * *